(12) United States Patent
Clothier

(10) Patent No.: US 6,320,169 B1
(45) Date of Patent: *Nov. 20, 2001

(54) METHOD AND APPARATUS FOR MAGNETIC INDUCTION HEATING USING RADIO FREQUENCY IDENTIFICATION OF OBJECT TO BE HEATED

(75) Inventor: Brian L. Clothier, O'Fallon, IL (US)

(73) Assignee: Thermal Solutions, Inc., Wichita, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/655,942

(22) Filed: Sep. 6, 2000

Related U.S. Application Data
(60) Provisional application No. 60/152,559, filed on Sep. 7, 1999.

(51) Int. Cl.[7] .................................. H05B 6/06; H05B 6/12
(52) U.S. Cl. .................. 219/626; 219/620; 219/665; 99/325; 340/572.1; 340/825.37
(58) Field of Search ................. 219/621, 620, 219/622, 624, 626, 627, 647, 649, 663, 665, 497, 494; 99/451, DIG. 14, 325; 340/572.1, 825.36, 825.37, 825.54

(56) References Cited

U.S. PATENT DOCUMENTS

| | | | |
|---|---|---|---|
| 3,742,174 | 6/1973 | Harnden, Jr. ................ | 219/627 |
| 3,742,178 | 6/1973 | Harnden, Jr. ................ | 219/627 |
| 3,742,179 | 6/1973 | Harnden, Jr. ................ | 219/627 |
| 3,828,164 | 8/1974 | Fischer et al. ................ | 219/431 |
| 4,020,310 | * 4/1977 | Souder, Jr. et al. ............ | 219/622 |
| 4,381,438 | 4/1983 | Goessler et al. .............. | 219/627 |
| 4,587,406 | 5/1986 | Andre ........................... | 219/497 |
| 4,816,646 | * 3/1989 | Solomon et al. ............... | 219/387 |
| 5,379,042 | 1/1995 | Henoch ........................ | 342/42 |
| 5,466,915 | * 11/1995 | Meier et al. .................. | 219/622 |
| 5,499,017 | 3/1996 | Beigel .......................... | 340/572 |
| 5,530,702 | * 6/1996 | Palmer et al. ................. | 370/85.3 |
| 5,682,143 | * 10/1997 | Brady et al. .................. | 340/572 |
| 5,951,900 | 9/1999 | Smrke ........................... | 219/497 |
| 5,963,134 | * 10/1999 | Bowers et al. ................ | 340/572.1 |
| 6,232,585 | * 5/2001 | Clothier et al. ............... | 219/620 |

FOREIGN PATENT DOCUMENTS 2 308 947 * 7/1997 (GB) .

* cited by examiner

*Primary Examiner*—Philip H. Leung
(74) *Attorney, Agent, or Firm*—Hovey, Williams, Timmons & Collins

(57) ABSTRACT

A temperature-regulating induction heating system is provided which comprises an induction heater (20) having apparatus (36, 38, 40) for receiving RFID transmissions and an induction heatable object (22) with an RFID tag (50). The heater (20) includes a component (28) for generating a magnetic field, control circuitry including a microprocessor (32) coupled with the component (28) for selectively initiating and terminating generation of a magnetic field; the receiving apparatus (36, 3 8, 40) provides information to the microprocessor (32) causing initiation of a heating algorithm for the object (22). In preferred forms, the tag (50) and apparatus (36, 38, 40) are designed for two-way information transfer, thereby permitting continuous updating of the information carried by tag (50). In this way, if induction heating of the object (20) is interrupted, it maybe resumed to nevertheless achieve a desired regulation temperature. Advantageously, the RFID tag (50) and apparatus (36, 38, 40) operate during intermittent interruption of the primary magnetic field of the heater (20) to eliminate transmission interference. The tag (50) may be equipped with one or more thermal switches (100, 104, 106) to provide better temperature control.

56 Claims, 7 Drawing Sheets

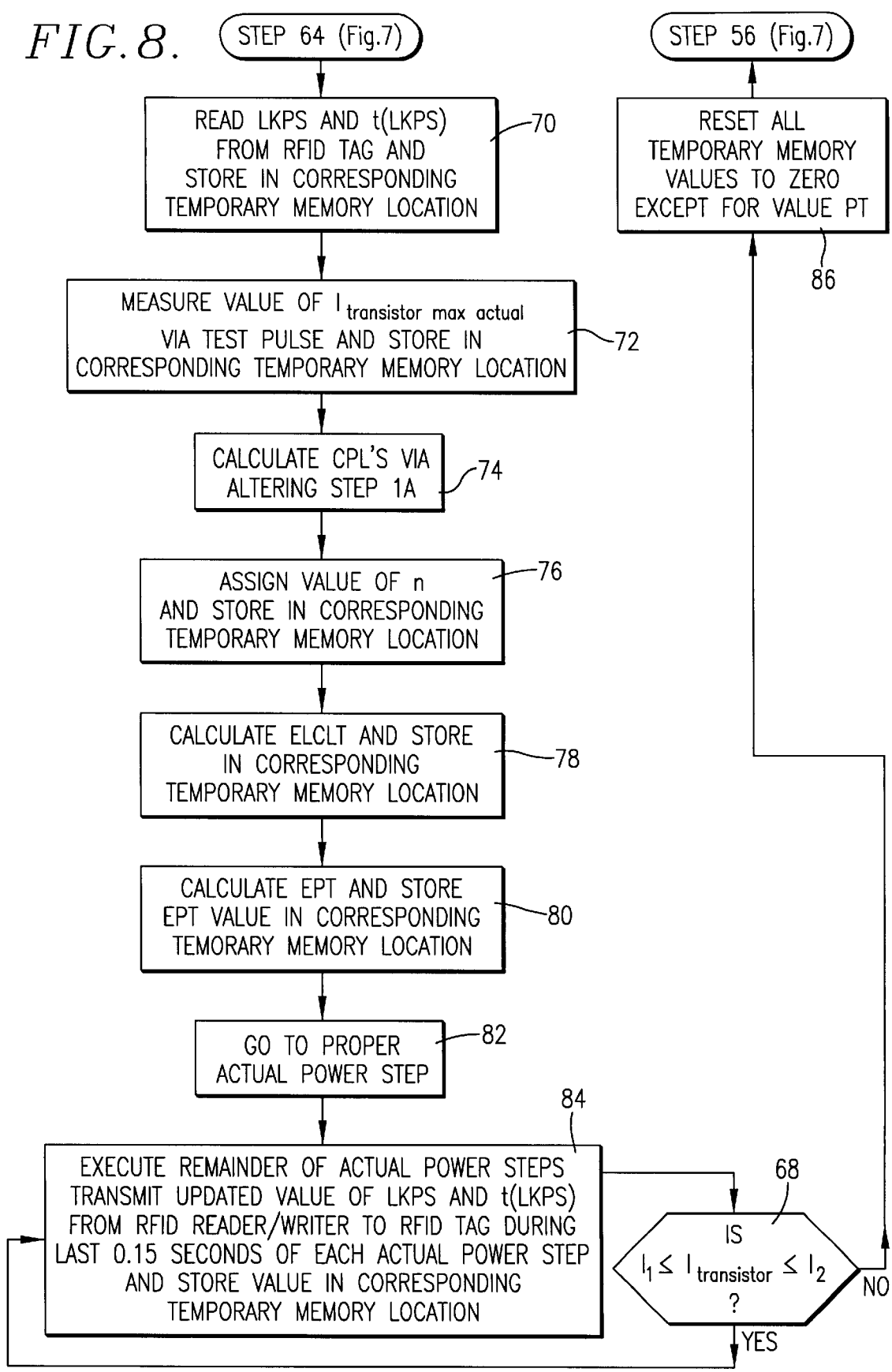

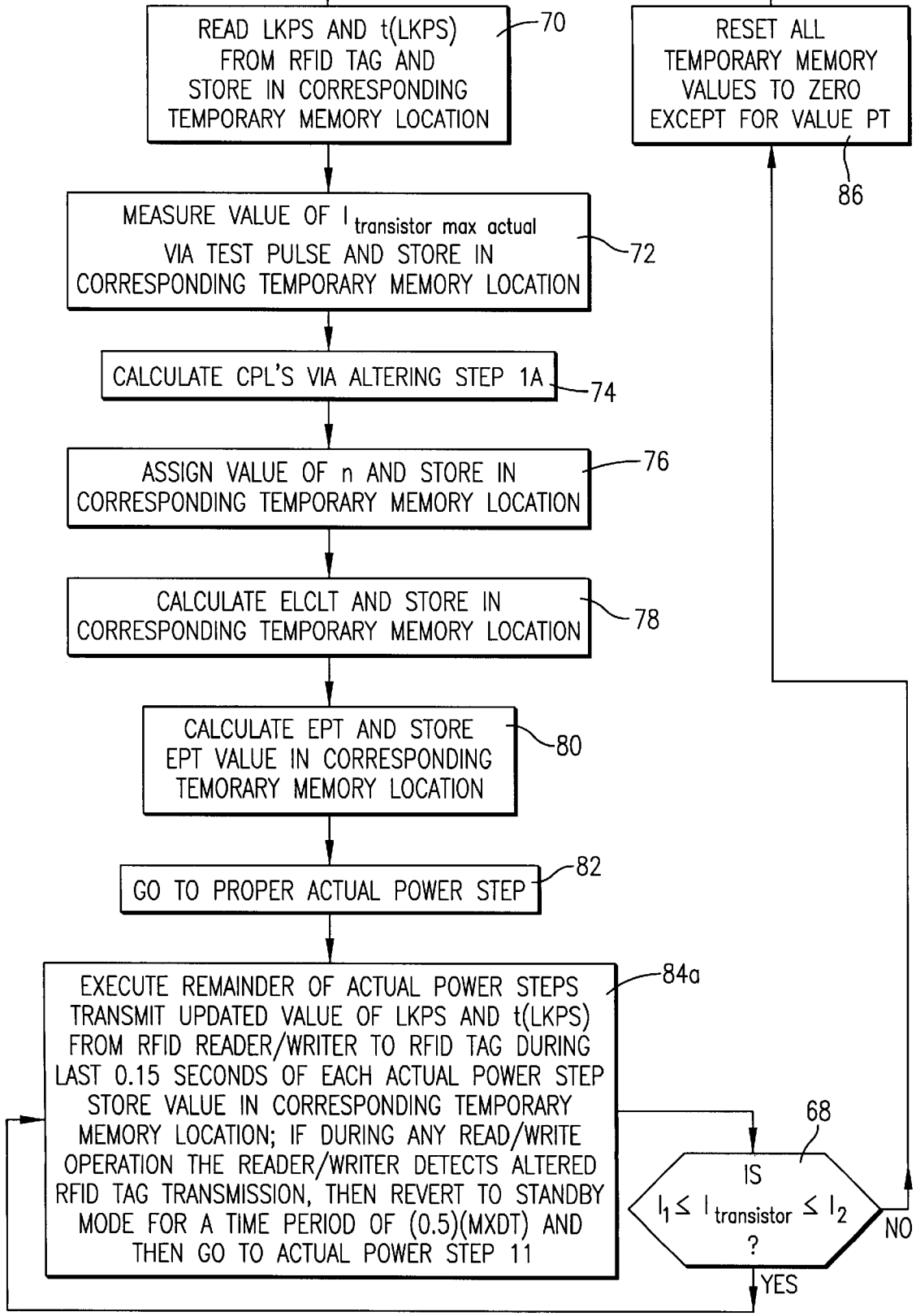

METHOD AND APPARATUS FOR MAGNETIC INDUCTION HEATING USING RADIO FREQUENCY IDENTIFICATION OF OBJECT TO BE HEATED

RELATED APPLICATION

This application claims the benefit of provisional patent application Serial No. 60/152,559 filed Sep. 7, 1999.

BACKGROUND OF THE INVENTION

1. Field of the Invention

The present invention is broadly concerned with magnetic induction heating systems and methods wherein an induction heatable object not physically connected to a magnetic induction heater can be heated and temperature regulated using Radio Frequency Identification (RFID) technology. More particularly, the invention is concerned with such systems, as well as the individual components thereof, wherein objects to be heated are equipped with RFID tags and the induction heaters include RFID readers; when a tagged object such as servingware is placed on a heater, the tag transmits information such as the class of object being heated, and the heater control circuitry uses the information to initiate and carry out an appropriate heating cycle for heating and temperature-regulating the object. In preferred forms, two-way transmissions between the tag and a reader/writer is established, with each having electronic memory to store relevant heating information. More precise temperature regulation is achieved using an RFID tag having an associated switch responsive to an external condition such as temperature experienced by the switch. The invention is applicable to virtually any type of induction heatable object such as food servingware.

2. Description of the Prior Art

U.S. Pat. Nos. 5,951,900 to Smrke, U.S. Pat. No. 4,587,406 to Andre, and U.S. Pat. No. 3,742,178 to Harnden, Jr. describe non-contact temperature regulation methods and devices employing magnetic induction heating. In these prior devices, radio frequency transmissions between an object to be heated and the induction appliance are employed in an attempt to control the induction heating process.

In Smrke, Andre, and Harnden a temperature sensor of some kind is attached to the object to be heated to provide feedback information which is transmitted to the induction appliance. In each case, aside from manual inputs by the user, changes to the power output from the induction appliance made by its controller are based solely upon information gathered and transmitted by the temperature sensor. Inasmuch as most objects to be temperature regulated are not homogeneous, this sole dependence upon feedback from the temperature sensor often leads to unwanted temperatures within certain portions of the object. For instance, when a sauce pan filled with dense food is placed upon an induction cooktop and the power is maintained at a constant level, the pan surface temperature quickly rises, whereas the food layer furthest away from the pan is still at ambient temperature. If a temperature sensor is placed upon the surface of the pan, the temperature measured at this point may have a unknown or variable relationship to the temperature of remote food layers. Thus, when the sensor reaches a pre-set temperature that the induction appliance's control unit attempts to maintain, much of the food may still be cold. Conversely, if the temperature sensor is placed adjacent the top layer of food, the pan surface may get excessively hot prior to this food layer reaching the desired temperature, resulting in scorched food near the pan surface.

Smrke attempts to solve this problem by requiring that the temperature sensor be placed upon the lid of a pot. Harnden teaches placing a temperature sensor in direct thermal contact with the ferromagnetic inner wall of a vessel. However, regardless of sensor location, the problems associated with heating a non-homogeneous object remain. Furthermore, neither proposed solution can prevent a temperature sensor from making imperfect thermal contact with its intended surface, a likely condition that leads to gross inaccuracies in temperature control. It is often difficult to manufacture a device so as to place one or more temperature sensors in perfect thermal contact. Also, over time, the thermal expansions and contractions that the sensor/object interface experience leads to imperfect thermal contact.

In addition to the requirement for a temperature sensor on or adjacent the object to be heated, the prior art devices also require periodic or continuous temperature measurement of the object, and thus periodic or continuous transmissions from the object to a receiver connected to the induction appliance. Neither Harnden, Andre, nor Smrke teach any practical means of preventing interference between these periodic or continuous RF transmissions and the main magnetic field produced by the induction appliance, so as to ensure proper receipt of feedback information.

In Harnden, a temperature sensor such as a thermistor provides a continuous variable voltage signal, corresponding to the temperature sensed, to a voltage control oscillator located within the object. The voltage control oscillator produces a variable frequency signal that corresponds to the sensed temperature. This variable radio frequency signal is transmitted to a receiving unit that is connected to the induction cooking range. In Andre, temperature measurements of the object are periodically transmitted to a receiving/controlling unit at constant intervals of time. Each temperature value is stored in the controlling unit's memory. A differentiating circuit then calculates the temperature difference and uses this information to control a heating element.

In order to the ensure proper reception of such temperature-based radio frequency feedback information, Harnden teaches that the output frequency of the feedback signal should be at least a megahertz or multiples thereof. This is not a practical solution for an emissions-regulated production appliance. In Andre and Smrke no consideration is given to any way of preventing interference between the RF temperature signal and the main magnetic field.

Furthermore, although temperature information from the object is important, it is often not sufficient to execute a proper heating operation to a desired regulation temperature within a desired period of time. For instance, it is well known that the power applied to an object placed upon an induction cooktop depends greatly upon the distance between the object's ferromagnetic material and the work coil of the cooktop. Should an object require a particular graduated power application to prevent overheating of some parts of the object while reaching the desired regulation temperature throughout the object, as in the earlier sauce pan example, it is essential that the proper power be coupled to the object during each graduation. Furthermore, most practical heating operations required that the prescribed regulation temperature be reached within a maximum prescribed time. This restraint makes it even more important that proper power be applied during each temperature gradation. A means to correct for inconsistent power coupling that is based upon comparisons between power measurements and stored power coupling data is essential to achieve consistent heating operations and accurate temperature regulation. Neither Smrke, Andre, nor Harnden address the transmission or use of other than temperature information.

Finally, although Smrke and Andre attempt to provide for multiple induction appliance operation with like-type objects, neither teaches how a single induction appliance may automatically differentiate between different types of objects placed upon it so as to apply a unique heating operation to each type. Andre employs differential temperature measurement to prevent overheating an object that is placed upon a different, unintended heating element. In Smrke, when more than one induction appliance exists, a central electronic unit that is connected to all induction appliances can accept signals from each transmitter attached to its respective pot and use them to determine which induction appliance the pot is atop. In neither case can a single induction appliance differentiate among various types of objects prior to commencement of heating of each object type.

RFID is an automatic identification technology similar in application to bar code technology, but uses radio frequency instead of optical signals. RFID systems can be either read-only or read/write. For a read-only system such as Motorola's OMR-705+ reader and IT-254E tag, an RFID system consists of two major components—a reader and a special "tag". The reader performs several functions, one of which is to produce a low-level radio frequency magnetic field, typically either at 125 kHz or at 13.56 MHz. The RF magnetic field emanates from the reader by means of a transmitting antenna, typically in the form of a coil. A reader may be sold in two separate parts: an RFID coupler, including a radio processing unit and a digital processing unit, and a detachable antenna. An RFID tag also contains an antenna, also typically in the form of a coil, and an integrated circuit (IC). Read/write systems permit two-way communication between the tag and reader/writer, and both of these components typically include electronic memory for the storing of received information.

SUMMARY OF THE INVENTION

The present invention provides a greatly improved method and apparatus for the magnetic induction heating of objects, especially for the temperature regulation of such objects at and approximate to predetermined temperatures. Broadly speaking, the invention contemplates a combination of an induction heating device and an induction heatable object wherein the object is equipped with an RFID tag and the heating device has apparatus for receiving information from the RFID tag. In use, the object is placed adjacent the heating device and the RFID tag is caused to transmit information (typically about a heating characteristic of the object) to the information-receiving apparatus associated with the heating device; this information is used in the control of the magnetic field generator forming a part of the heating device.

In preferred forms, the induction heating device includes a component (e.g., an ultrasonic frequency inverter) for generating a magnetic field in order to inductively heat the object, together with microprocessor-based control circuitry coupled with the generating component for selectively initiating and terminating magnetic field generation. The information-receiving apparatus is operably coupled with the control circuitry, and normally includes an RFID signal reader (preferably a reader/writer) and an RFID power transmission antenna. The RFID tag associated with the object to be heated includes a transmission circuit and an antenna. In the preferred two-way systems of the invention, both the reader/writer and the RFID tag have electronic memory for storing information. The control circuitry of the heating device also advantageously includes a sensor operable to measure a circuit parameter related to the impedance of the load experienced by the device; such a sensor periodically or continuously determines such a parameter (such as current) in order to determine if the object to be heated is placed within the magnetic field.

A particular feature of the invention is that the RFID tags associated with respective classes of objects to be heated permit the use of different induction heating devices, so long as the latter are equipped with RFID readers and associated circuitry. Moreover, a given induction heating device may store multiple heating algorithms designed for heating of different classes of objects; when an object of a given class is placed on the device, the object tag transmits to the reader the identity of the class, thus initiating the heating algorithm for that class. Additionally, in the preferred systems of the invention the object tag contains stored information which is periodically updated by transmissions from the reader/writer, thereby storing on the tag the relevant induction heating history of the particular object. In this way, if a particular object is removed from the induction heater for a short period of time and then replaced, the updated RFID tag information can be communicated to the induction heater so as to resume the appropriate heating algorithm.

In order to assure high integrity, interference-free transmissions between the RFID tag and the reader/writer, the induction heating device is designed so that these transmissions occur during intermittent cessations of operation of the primary magnetic field generator of the heater.

In order to provide better temperature regulation, the RFID tags associated with objects to be heated include a switch which is switchable between circuit make and circuit break orientations in response to an external condition experienced by the switch, thereby altering the operation of the RFID tag. For example, one or more thermal switches may be operably coupled with the tag (usually the antenna or EEPROM of the tag) so that when the thermal switch experiences a predetermined temperature condition, the switch(es) responsively operate to prevent or alter transmission of information from the tag.

Induction heatable objects equipped with the RFID tags of the invention, as well as induction heaters having appropriate control circuitry and apparatus for receiving RFID tag information, corresponding methods, and RFID tag-switch composites are also separate, individual aspects of the invention.

BRIEF DESCRIPTION OF THE DRAWINGS

FIG. 8 is a flow chart of a specific software heating algorithm relative to the servingware depicted in FIG. 1;

FIG. 11 is a list of exemplary instructions illustrating the heating operation for an object employing an RFID tag with one or more thermal switches attached thereto, and wherein the temperature information is used to define regulation temperature.

DETAILED DESCRIPTION OF THE PREFERRED EMBODIMENT

Figure 1:
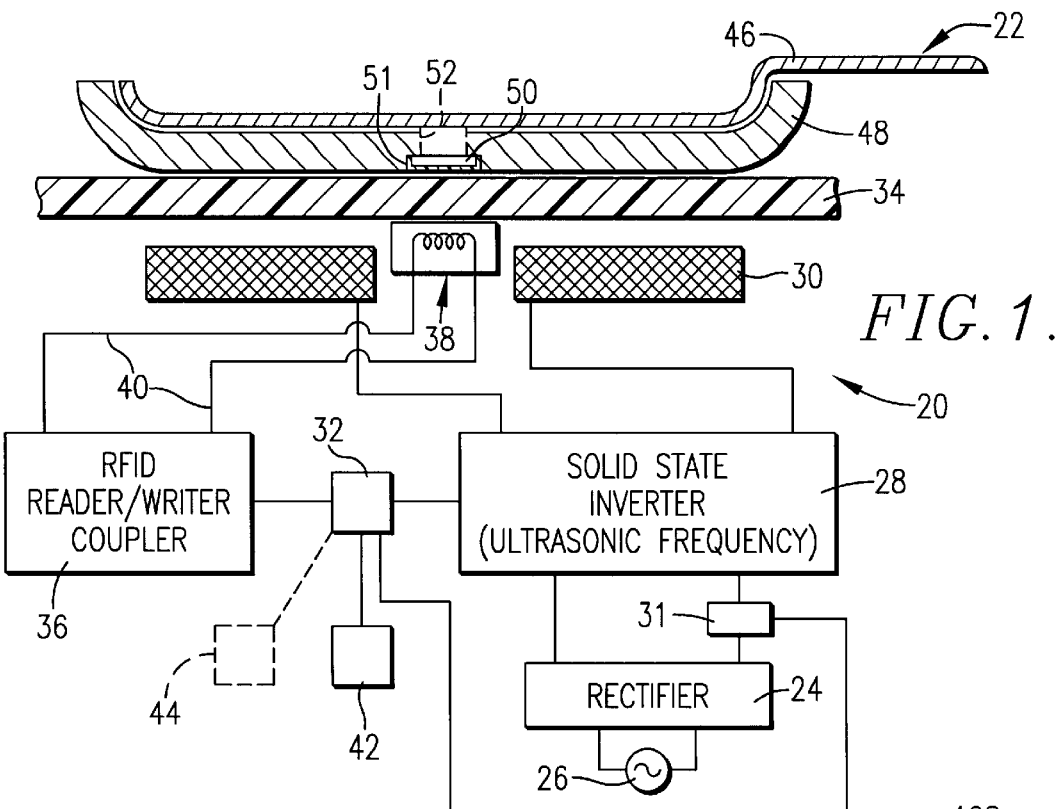
FIG. 1 is a schematic view of an induction heating device in accordance with the invention, supporting servingware designed to be heated using the device.

Embodiment of FIG. 1

Broadly speaking, the heating apparatus of the invention includes a specialized magnetic induction heating device together with an induction heatable object to be temperature-regulated which has a RFID read/write tag. To this end, the heating device is preferably capable of reading the digital information stored on the RFID lag, and also may periodically write new digital information onto the tag. Appropriate software algorithms are provided for microprocessor control of the heating device, and can be modified based upon information read from the RFID tag and/or from measured induction heating device circuit parameters.

The preferred embodiments of the present invention relating to cookware and controlled induction heating thereof incorporate some of the features described in U.S. Pat. No. 5,954,984 and pending application for U.S. patent Ser. No. 09/314,824 filed Feb. 19, 1999 which are incorporated by reference herein.

FIG. 1 depicts a preferred induction heating device in the form of a cooktop 20, with exemplary, induction-heatable servingware 22 thereon, in this case a so-called "sizzle plate" used in restaurants. The device 20 comprises a rectifier 24 coupled with commercially available alternating current from an outlet 26, in order to convert the alternating current to direct current. The rectifier is coupled with a solid state inverter 28 in order to convert the direct current into ultrasonic frequency current (preferably from about 20–100 kHz) directed through induction work coil 30. A microprocessor-based control circuit including microprocessor 32 is operably coupled with and controls the inverter 28; this circuitry may also control various other of the cooktop's internal and user-interface functions. The control circuitry also includes a circuit parameter sensor 31 coupled with microprocessor 32 to measure a parameter related to or dependent upon the load experienced by device 20 during use; in practice, this may be a current sensor within inverter 28 which measures current through one of the inverter's switching transistors. The device 20 also includes an object support 34 above the coil 30. Items 24, 28, 30, 32, and 34 comprise the major components of many commercially available induction cooktops. One particularly preferred induction cooktop useful in the context of this invention is CookTek Model CD-1800, although a variety of other commercially available appliances may also be used.

The device 20 also includes a RFID reader/writer coupler 36 which is connected with the microprocessor 32; this connection preferably allows RS-232 protocol communications. The preferred coupler 36 is Gemplus' GemWave™ Medio SO13. This coupler has RS-232, RS485, and TTL communication protocols and can transmit data at up to 26 kb/s. In addition, an RFID antenna 38 forms a part of the device 20, and is connected to coupler 36 via coaxial cable 40. Gemplus' Model 1" antenna is preferably used because of its small size, lack of a ground plane, and a read/write range of approximately two inches; Gemplus' Model Medio A-SA also works satisfactorily.

The device 20 normally also includes a real time clock 42 which can maintain accurate time over long periods. The clock is microprocessor-compatible and preferably contains a back-up power supply that can operate for prolonged periods if the induction heating device 20 is unplugged. Compatible clocks include National Semiconductor Model MM58274C or Dallas Semiconductor Model DS-1286.

The device 20 also preferably has additional memory 44 that can be accessed by the microprocessor 32. The memory device 44 should be capable of being either written to easily or replaced easily so as to allow the user to add software algorithms whenever a new type of object, not previously programmed, is to be heated using the device 20. One preferred memory unit is a flash memory card such as Micron's CompactFlash card; another is an EEPROM device or a flash memory device equipped with a modem connection so as to allow reprogramming from a remote site over a telephone line.

The exemplary servingware 22 in the form of a"sizzle plate" includes a metallic (e.g., cast iron) pan 46 that is set into a base 48 typically formed of wood, plastic or ceramic materials. A RFID tag 50 is operably coupled to the servingware 22 in a recess formed in base 48, and is secured via adhesive 51 or some other suitable connection medium. One preferred RFID tag is Gemplus' GemWave Ario 40-SL, Stamp having dimensions of 17×17×1.6 mm and designed to withstand extreme temperature, humidity and pressure conditions. This tag has a factory embedded 8 byte code in block zero, page zero of its memory, and has two kb EEPROM memory arranged in four blocks, each block containing four pages of data. Each page of 8 bytes can be written to separately by the reader. Other suitable RFID tags include Gemplus' Ario 40-SL Module, and the ultra-small Gemplus' Arlo 40-SDM.

As shown, the RFID tag 50 need not be in direct thermal contact with the portion of the object in which current is being induced, such as the metallic plate 46 of the servingware 22. In fact, due to the limited operating temperatures of most RFID tags (the Motorola IT-254E tag can withstand continuous operating temperatures up to 200° C., the Gemplus Ario-40 SL Stamp tag can withstand temperatures up to 350° F.), it is preferred that the tag be somewhat thermally isolated from any such metallic heating element. The important point is that the tag 50 will carry information about the object's identity and its induction heating history. Furthermore, the tag will transmit that information to any RFID reader/writer that interrogates it. When the tag receives the magnetic field energy of the reader, it transmits programmed memory information in the IC to the reader, which then validates the signal, decodes the data, and transmits the data to a desired output device in a desired format. This programmed memory information typically includes a digital code that uniquely identifies In object. The RFID tag may be several inches away from the RFID reader's antenna and still communicate with the reader.

Figure 2:
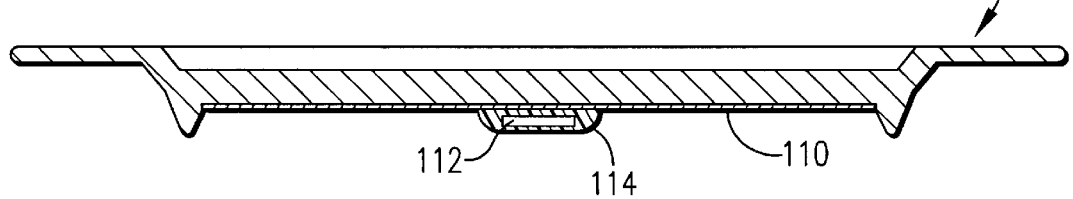
FIG. 2 is a schematic cross-sectional view of a china plate body equipped with a metallic coating on its bottom surface and a centrally located RFID tag adhered to the metallic coating.

The servingware 22 depicted in FIG. 2 also illustrates the use of an optional thermal switch 52. Such a switch is not required, but is often preferred. The specific design and use of a thermal switch in this context is described in greater detail.

Figure 3:
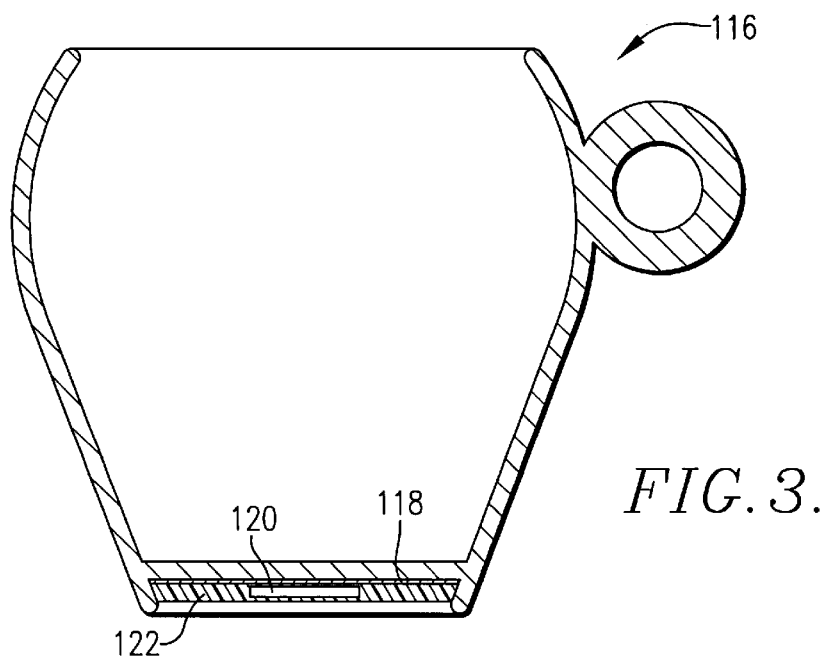
FIG. 3 is a schematic vertical sectional view of a china body espresso cup with a metallic coating on its bottom surface and a centrally located RFID tag adhered to the bottom surface.

In the following discussion, the hardware construction and software control of the exemplary induction heating device 20 and the sizzle plate servingware 22 will be described in detail. It should be understood, of course, that this discussion is equally applicable (with appropriate changes based upon desired end uses) to all types of other servingware such as illustrated in FIGS. 2 and 3, and also to a wide variety of other induction heatable objects such as the heating pellet depicted in FIG. 4. Therefore, this description should be taken in a broad sense as merely one possible utilization of the invention.

Hardware Integration—RFID Reader/Writer

As noted previously, the RFID reader/writer 36 is operably coupled with the microprocessor-based control circuit of the induction heating device 20. The antenna 38 of the RFID reader/writer 36 should be placed such that the servingware 22 is within reading/writing distance from the RFID reader/writer 36 when the servingware 22 object is to be heated. In one preferred antenna configuration, a flat spiral antenna coil of the RFID antenna is situated in planar relationship and within the central opening of the work coil 30. Referring to FIG. 1, tests have shown that the RFID antenna may also be placed between plane of the induction work coil 30 and the cooktop support surface 34 without inducing detrimental currents in the RFID antenna during cooktop operation.

Regardless of the precise antenna orientation, it is preferred that the antenna 38 be placed in the center of the work coil 30. In order to heat various types of objects evenly on the same work coil 30, it is desirable to center each item over the work coil 30. Furthermore, a single RFID antenna 38 should preferably couple with a tag 50 placed upon one of as many different types of induction-compatible objects as possible.

The RFID reader/writer and tag system made up of the reader/writer 36, antenna 38 and RFID tag 50 should transmit and receive at least the following types of information: 1) the type or class of object (hereafter referred to as COB); 2) the object's last known power step of the heating algorithm (hereafter referred to as LKPS); and 3) the last known time of application of the last known power step of the heating algorithm (hereafter referred to as t(LKPS)). This information should be transmitted by the RFID tag 50 and read by the RFID reader/writer 36 upon placement of an object such as the servingware 22 atop the device 20. Furthermore, this information (with the exception of COB), and possibly other information, is preferably rewritten to the RFID tag 50 once every chosen time interval, $\Delta t_{between\ transmit}$, during the entire time the servingware 22 is being brought to the selected regulation temperature by the device 20. The duration of time that is required for the read/write operation to take place is referred to as $\Delta t_{transmit}$. Using a read/write system such as Gemplus' GemWave Medio™ SO13 reader/writer and Ario 40-SL read/write tag, $\Delta t_{transmit}$ for pre-production prototypes has been found to be approximately 150 milliseconds.

Preferably, the communication between the reader/writer 36 and tag 50 occurs during interruptions in magnetic field production by the device 20. That is, it is desirable to interrupt the production of the main magnetic field just prior to the transmission of information between the RFID reader/writer 36 and tag 50, and to resume production of the main magnetic field after cessation of RFID transmission. This interruption can be triggered by using a 5 volt output signal emanating from one of the three built-in output ports on the Gemplus Medio SO-13 coupler to trigger the inverter of the cooktop. Alternatively, due to the microprocessor control of most cooktops and available communication between the RFID coupler and said microprocessor, the interruption may be synchronized through the microprocessor 32.

For instance, even during normal operation, a CookTek Model C-1800 cooktop's inverter is "on" (current is flowing through the switching elements to the work coil so as to replenish energy transferred to the load) for only 59 of 60 power supply (line) cycles even when the highest power output level is used. For lower output levels during normal operation, fewer than 59 "on" cycles of the inverter are used.

During the "off" times of the inverter no rectified current is allowed to flow from the AC power source through the switching elements to the work coil 30. During these "off" times, the near-zero intensity of the emanating magnetic field produces no interference with transmissions between RFID tag 50 and reader/writer 36. The microprocessor 32 can thus control the number and timing of "on" and "off" cycles of the inverter and also control the time at which the RFID reader/writer 36 transmits and receives information from the RFID tag 50. Thus, it is possible to successfully read and write information from RFID reader/writer 36 to RFID tag 50 during the "off" times of the inverter when magnetic field interference is at a minimum, even without modifying the "normal operations" power level duty cycles.

Furthermore, because of the flexibility and ease of programming of the microprocessor 32, the "normal operations" power level duty cycles can be modified to cause the inverter to remain "off" for any number of cycles during a chosen 60 cycle period or during some other time interval. These "off" cycles may be timed to occur periodically beginning at any desired time interval. For instance, at consecutive time intervals hereafter referred to as "elapsed time between commencement of transmittals", or $\Delta t_{between\ transmit}$, the microprocessor can ensure that current flowing through the switching transistors to the work coil 30 is interrupted for a duration of time, $\Delta t_{transmit}$. In this example, the maximum possible effective percentage of "on" time of the inverter is $\{(\Delta t_{between\ transmit} - \Delta t_{transmit})/(\Delta t_{between\ transmit})\}$. It should be noted that, because $\Delta t_{transmit}$ is consistent, $\Delta t_{between\ transmit}$ is also the elapsed time between termination of transmittals. Regardless of the periodicity chosen, a sufficient interference-free transmit/receive period can be achieved by synchronizing the transmit/receive period of the RFID reader/writer/tag system 36, 38, 50 with the times of near-zero magnetic field production of the work coil 30.

Inasmuch as the RFID reader/writer 36 may be chosen to have an output frequency (either 125 kHz, 13.56 MHz, or other frequencies) far different from that of the induction cooktop (typically 20–60 kHz), its associated antenna 38 may transmit and receive data from the RFID tag reliably during these inverter "off" times. Furthermore, since the watt density of the field produced by the magnetic induction cooktop is sufficiently low, the antennas of the reader/writer 36 and tag 50 do not develop damaging currents from exposure to said field during the inverter on times.

Software Integration

The principal purpose of software integration is to implement a software algorithm to be followed by the magnetic induction heating device 20 that allows it to heat an object that may begin a heating cycle at any given temperature to the desired regulation temperature and maintain it there over an indefinite period of time. "Software integration", refers to the fact that the software algorithm should preferably allow the microprocessor 32 to use the following three sources of information to tailor a pre-programmed heating algorithm to the specific initial conditions that exist when heating begins: 1) information retrieved from the RFID tag 50; 2) information from the circuit sensors of the device 20 which monitor circuit parameters such as current and voltage; and 3) information stored in a memory accessible to the microprocessor 32.

Another purpose of the software algorithm is to allow many different types of objects, each with a different regulation temperature and heating requirement, to be temperature regulated using the same device 20. This can be easily accomplished if the RFID tag 50 of each respective object stores identity information that, once read by the RFID reader/writer 36, is used by this software algorithm to access and modify the proper pre-programmed heating algorithm that has been designed for that specific type of object.

In summary, the microprocessor 32 of the device 20 has an overriding software algorithm that, based upon a particular RFID tag's identity information, accesses one of many pre-programmed heating algorithms. A pre-programmed heating algorithm, hereafter referred to as a "heating algorithm for a specific class of object", or HA(COB), is a specific set of data, formulas for calculating necessary variables, and instructions stored in memory that is used by the cooktop to heat and temperature regulate a specific "class of object", (COB). The basic tasks of the HA(COB) are to:

Task 1: Estimate the Present Temperature of the Object, EPT.

Task 2: Using the calculated value of EPT, begin heating the object using "corrected" power levels for specific elapsed times (beginning at the proper "corrected" power level and for the proper elapsed time at the power level) so as to bring the object from its EPT to the desired regulation temperature and maintain it there.

Task 3: Update the RFID tag 50 attached to the object with the object's last known power step of the heating algorithm ,LKPS, and the time of application of this step of the heating algorithm, t(LKPS), once every time interval $\Delta t_{between\ transmit}$ until reaching the desired regulation temperature.

To accomplish these basic tasks, an HA(COB) may be developed and implemented in the manner described below. For purposes of example, the software required to properly heat the "sizzle platter" depicted in FIG. 1 using the device 20 will be described, wherein the food-contacting surface of the cast iron pan 46 should have a desired regulation temperature of 250° F. plus or minus 20° F.

Heating Algorithm

In order to accomplish Tasks 1 and 2, "permanent memory" data that is required to temperature regulate the object under "ideal" operating conditions should first be gathered. This data includes both heating and cooling information gathered under "ideal" operating conditions. Permanent memory data is not updated periodically, but is permanently stored in a memory location corresponding to, or easily accessible to, HA(sizzle plate). Although it is preferred that the permanent memory data be stored in a memory device that is part of the induction heating device (such as the additional memory device 44 of FIG. 1), it is also possible for this information to be stored within the RFID tag's EEPROM memory. In this case, the EEPROM memory locations corresponding to this permanent memory data need not be rewritten to once the RFID tag is put into service. Regardless of the physical location of the permanent memory data, it must be available to the microprocessor 32 prior to and during the heating operation.

Then knowing that ideal operating conditions will almost never occur, "altering" instructions and formulas to be used within the heating algorithm are developed to allow the system to operate under "actual" operating conditions. Finally, for these "altering" instructions and formulas to be used within the heating algorithm, information is periodically gathered by the RFID reader/writer 36 and by the cooktop circuit sensors. This gathered information is stored in "temporary memory" and is updated periodically throughout the heating operation.

The resultant set of "altering" instructions and formulas, stored "permanent memory" information, and "temporary memory" information comprise the "building blocks" of the heating algorithm that is programmed for use by the integrated microprocessor 32. An actual software algorithm and the HA(sizzle plate) algorithm will be described line-by-line once these "building blocks" have been described below.

"Building Block" 1: "Permanent Memory" Data Under "Ideal" Conditions

Assumed "ideal" operating conditions for a sizzle plate are that the sizzle plate: 1) is never heated from an initial plate temperature lower than room temperature, 2) is always heated with no food on its upper surface, 3) is always placed oil the device 20 so as to magnetically couple at peak efficiency, and 4) is always removed from the cooktop only when it has reached the desired regulation temperature. With these ideal conditions controlled, a representative sizzle plate is heated on a representative magnetic induction cooktop. Thermocouples are attached to the sizzle plate and their measurements are used as feedback by the cooktop's microprocessor so as to bring the object to the desired regulation temperature in the desired period of time. The same feedback is used to maintain the desired regulation temperature for a period of time until equilibrium exists and a distinct pattern of required cooktop warming operations emerges. Once the cooktop is operating to heat and warm the sizzle plate within specifications, measurements are taken of all significant object temperature and cooktop circuit parameters while the sizzle plate is being heated to its regulation temperature and held there.

The following information is gathered and stored in "permanent memory" which is accessible to the cooktop's microprocessor for use within HA(sizzle plate).

TABLE 1

| Information | Code Identifier |
|---|---|
| 1) Time period between start of read/write transmissions from/to RFID tag | $\Delta t_{between\ transmit}$ |
| 2) Ideal Power Level #1 (93% Inverter "on" time) Command 111 "on" cycles, 9 "off" cycles, repeat | IPL1 |
| 3) Ideal Power Level #2 (83% Inverter "on" time) Command 100 "on" cycles, 20 "off" cycles, repeat | IPL2 |
| 4) Ideal Power Level #3 (74% Inverter "on" time) Command 89 "on" cycles, 31 "off" cycles, repeat | IPL3 |
| 5) Ideal Power Level #4 (65% Inverter "on" time) | IPL4 |

TABLE 1-continued

| Information | Code Identifier |
|---|---|
| Command 78 "on" cycles, 42 "off" cycles, repeat | |
| 6) Ideal Power Level #5 (55% Inverter "on" time) Command 66 "on" cycles, 54 "off" cycles, repeat | IPL5 |
| 7) Lowest expected operating temperature (72 F.) | T(0) |
| 8) Temperature after Ideal Power Step 1 | T(1) |
| 9) Temperature after Ideal Power Step 2 | T(2) |
| 10) Temperature after Ideal Power Step 3 | T(3) |
| 11) Temperature after Ideal Power Step 4 | T(4) |
| 12) Temperature after Ideal Power Step 5 | T(5) |
| 13) Temperature after Ideal Power Step 6 | T(6) |
| 14) Temperature after Ideal Power Step 7 | T(7) |
| 15) Temperature after Ideal Power Step 8 | T(8) |
| 16) Temperature after Ideal Power Step 9 | T(9) |
| 17) Regulation Temperature (250 F.) | T(10) |
| 18) Linear Cooling rate #1 (from T(10) to T(6)) | $CR_1$ |
| 19) Linear Cooling rate #2 (from T(6) to T(2)) | $CR_2$ |
| 20) Linear Cooling rate #3 (from T(2) to T(0)) | $CR_3$ |
| 21) Magnitude of the current that flows through the cooktop's switching transistor during inverter "on" times with the load ideally coupled | $I_{transistor\ max\ ideal}$ |
| 22) Maximum delay time (120 seconds) | MXDT |

The time scale for the heating process, which is what $\Delta t_{between\ transmit}$ effectively is, is chosen dependent upon customer demands. It is assumed that the customer has required that the sizzle plate be heated from room temperature to its upper food contacting surface temperature of 250° F.±20° F. within 25 seconds after being placed upon the cooktop. Through calculation and experimentation, it has been determined that a 5.0 kW induction cooktop employing the power control method of the CookTek Model CD-1800 cooktop can accomplish this task. It should be noted that the value of $\Delta_{between\ transmit}$ will determine the accuracy and precision of a given temperature regulation operation for this preferred regulation method wherein no temperature sensor is employed. The smaller the effective heating time scale chosen, the more accurate the regulation temperature will be and the smaller the variations in temperature about said regulation temperature will be. However, the smaller the time scale chosen, the fewer number of complete heating cycles an RFID tag will endure before needing to be replaced. A typical RFID tag is designed to operate for at least 100,000 read/write operations before failure. Since the time required to heat the sizzle plate of FIG. 1 from room temperature to an average upper surface temperature of 250° F. requires at fewest 10 read/write operations, the RFID tag attached to the sizzle plate cannot be guaranteed to last more than 10,000 heating cycles.

Based upon the assumed customer requirements and a selected balance between accuracy, precision, and system longevity, $\Delta t_{between\ transmit}$ for the sizzle plate application is selected as 2.0 seconds. This value is stored in permanent memory which is accessible to the cooktop's microprocessor for use within the HA(sizzle plate).

It would appear that the simplest way to induction heat the sizzle plate such that the upper food-contacting surface reaches a uniform 250° F. temperature would be to apply all available coupled power from the cooktop for the entire heating time period. However, for many objects, including this sizzle plate, the skin effect, combined with the finite thermal conductivity of the object itself, causes a delay in temperature equilibration between the temperature of the food-contacting surface and the surface closest to the induction work coil. Thus, in this case, it is found that the best way to achieve a uniform 250° F. food-contacting surface at the end of the heating cycle without grossly overshooting it or without causing the surface nearest the work coil to reach temperatures much higher than 250° F. is to "step down" the level of the power levels applied to the sizzle plate as the temperature of the food-contacting surface increases.

Figure 5:
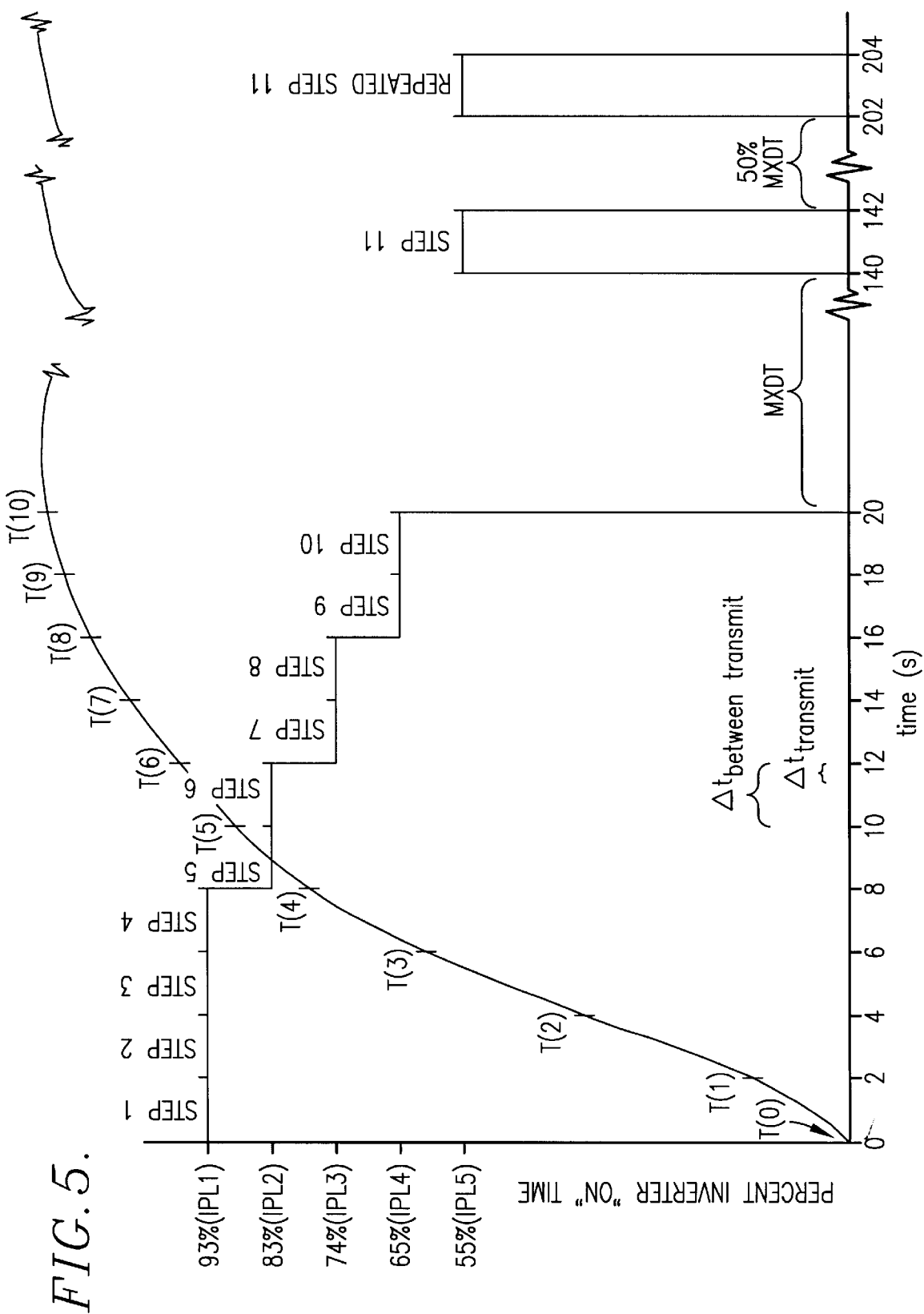
FIG. 5 is a graph of cooktop power versus time illustrating the sequence of ideal power steps comprising a portion of the heating algorithm for the servingware illustrated in FIG. 1, and with a graph overlay of the average surface temperature of the servingware plotted on the same time scale.

FIG. 5 graphically depicts the desired sequence of "ideal" power levels to be applied to the sizzle plate at room temperature to achieve a uniform 250° F. food-contacting surface within 25 seconds. Each ideal power level application for a unit of time equal to one time interval $\Delta t_{between\ transmit}$ will be hereafter referred to as an "Ideal Power Step." There are ten Ideal Power Steps in this example required to bring the sizzle plate from room temperature to a uniform surface temperature of 250° F. It should be noted that the average food-contacting surface temperature sizzle plate actually reaches only 250° F. at the end of Ideal Power Step 10, but it continues to climb thereafter. Table 2 is a written list of the sequence of Ideal Power Steps as shown in FIG. 5. This sequence of Ideal Power Steps is used as the blueprint to command the cooktop's operation during a heating operation of the sizzle plate except that "ideal" power levels will be replaced within each Ideal Power Step by "corrected" power levels.

TABLE 2

| Step Number | Command to Cooktop |
|---|---|
| Ideal Power Step 1 | Apply IPL1 for 2 sec* |
| Ideal Power Step 2 | Apply IPL1 for 2 sec* |
| Ideal Power Step 3 | Apply IPL1 for 2 sec* |
| Ideal Power Step 4 | Apply IPL1 for 2 sec* |
| Ideal Power Step 5 | Apply IPL2 for 2 sec* |
| Ideal Power Step 6 | Apply IPL2 for 2 sec* |
| Ideal Power Step 7 | Apply IPL3 for 2 sec* |
| Ideal Power Step 8 | Apply IPL3 for 2 sec* |
| Ideal Power Step 9 | Apply IPL4 for 2 sec* |
| Ideal Power Step 10 | Apply IPL4 for 2 sec* |
| Time Period MXDT | Command CookTop into Standby Mode where 1 cycle test pulses check for load within impedance limits** |
| Ideal Power Step 11 | Apply IPL5 for 2 sec** |
| Time Period (0.50)(MXDT) | Command CookTop into Standby Mode where 1 cycle test pulses check for load within impedance limits** |
| Ideal Power Step 11 | Apply IPL5 for 2 sec** |
| Time Period (0.50)(MXDT) | Command CookTop into Standby Mode where 1 cycle test pulses check for load within impedance limits** |
| Repeat Previous Two Steps Indefinitely** | |

*during the last 0.15 seconds of every Ideal Power Step, the RFID reader/writer communicates with the RFID tag.
**The value of LKPS will never be assigned greater than the number 10. However, the actual time of completion of each Actual Power Step 11 will be used to update t(LKPS).

The magnitude of each ideal power level within the sequence of Ideal Power Steps is "ideal" because it is based upon a desired ("ideal") power coupling efficiency between the object and the work coil of the induction cooktop, i.e., it is based upon the cast iron portion of the sizzle plate being centered over the work coil, the cast iron portion of the sizzle plate being the standard height above the work coil, and the line voltage of the commercial power supply being at a value chosen as standard. Although the power level of a cooktop such as the CookTek Model CD-1800 cooktop, or its 5 kW counterpart, may be 59 "on" cycles of 60 line cycles, the actual power coupled to the sizzle plate may be less for a sizzle plate not centered over the work coil than for sizzle plate with ideal coupling efficiency on the same cooktop employing only 40 "on" cycles of 60 available cycles. Thus, it is important that a distinction be made between a "power level" and the actual power coupled to the load (sizzle plate).

Therefore, for this example wherein the cooktop's power output is controlled by the percentage of inverter "on" time, a "power level" will hereafter be expressed in teens of percentage of inverter "on" time. The actual power coupled to the sizzle plate for a given "power level" can be deduced (and will be expressed hereafter) by measuring one or more of various cooktop circuit parameters.

The highest ideal power level used during final modeling (Ideal Power Level 1, hereafter referred to as IPL1) to determine this sequence of Ideal Power Steps is the highest that will be available to the heating algorithm under ideal conditions. Therefore, it is the power level for which the effective percentage of "on" time of the inverter is $\{(\Delta t_{between\ transmit} - \Delta t_{transmit})/(\Delta t_{between\ transmit})\}$. All subsequently applied lower ideal power levels (Ideal Power Level 2 (IPL2), Ideal Power Level 3 (IPL3), Ideal Power Level 4 (IPL4), and Ideal Power Level 5 (IPL5)) are also described in terms of percentage of inverter "on" time. These percentages for the sizzle plate example are described later in this disclosure.

FIG. 5 also shows the first of a sequence of Ideal Power Steps to be applied to the sizzle plate once it reaches 250° F. so as to maintain it at that temperature (within 20F) indefinitely. Ideal Power Step 11 is a short burst of energy applied to the object over one time interval $\Delta t_{between\ transmit}$ that adds enough energy to overcome losses to the environment while the object is awaiting usage. For the sizzle plate, Ideal Power Step 11 is applied at an ideal power level of 55% inverter "on" time and for a duration of one time period $\Delta t_{between\ transmit}$. It should be noted that after Ideal Power Step 10 is completed, transmissions between RFID reader/writer and RFID tag to update t(LKPS) but not the actual value of LKPS are still made. Thus the value LKPS remains at 10 during Ideal Power Step 11 applications but the value of t(10) is updated to reflect the completion time of the latest Ideal Power Step 11.

Ideal Power Step 11 is repeated indefinitely until the object is removed from the cooktop. However, Ideal Power Step 11 is not necessarily repeated at equal intervals of time between applications. The interval of time between consecutive applications of Ideal Power Step 11 is hereafter referred to as the delay time, or DT. Although the delay time may be variable, a maximum delay time, hereafter referred to as MXDT, is determined and is stored in permanent memory. For the sizzle plate of this example, MXDT is determined to be 2 minutes. For the sizzle plate, Ideal Power Step 11 is first applied a delay time of MXDT after the conclusion of Ideal Power Step 10. Thereafter, an identical Power Step 11 is applied to the sizzle plate at consecutive delay times equal to (50% MXDT), or 1 minute.

To summarize the results of applying the above sequence of Ideal Power Steps applied to the sizzle plate under ideal conditions to bring it from room temperature to an average surface temperature of 250° F.±20° F. and maintain it there, the following occurs:

Ideal Power Step 1 is applied at IPL1. During Ideal Power Step 1, the sizzle plate's average food contacting surface temp rises from room temperature (designated as T(0)) to temperature T1=100° F. Ideal Power Step 2 is then immediately applied at IPL1. During Power Step 2 the sizzle plates surface temp rises from temperature T(1)=100° F. to temperature T(2)=130° F. Ideal Power Step 3 is then immediately applied at IPL1. During Ideal Power Step 3 the sizzle plates surface temp rises from temperature T(2)=130° F. to temperature T(3)=160° F. Ideal Power Step 4 is then immediately applied at IPL1. During Ideal Power Step 4 the sizzle plates surface temp rises from temperature T(3)=160° F. to temperature T(4)=190° F. Ideal Power Step 5 is then immediately applied at IPL2. During Ideal Power Step 5 the sizzle plates surface temp rises from temperature T(4)=190° F. to temperature T(5)=210° F. Ideal Power Step 6 is then immediately applied at IPL2. During Ideal Power Step 6 the sizzle plates surface temp rises from temperature T(5)=210° F. to temperature T(6)=224° F. Ideal Power Step 7 is then immediately applied at IPL3. During Ideal Power Step 7 the sizzle plates surface temp rises from temperature T(6)=224° F. to temperature T(7)=232° F. Ideal Power Step 8 is then immediately applied at IPL3. During Ideal Plower Step 8 the sizzle plates surface temp rises from temperature T(7)=232° F. to temperature T(8)=240° F. Ideal Power Step 9 is then immediately applied at IPL4. During Ideal Power Step 9 the sizzle plates surface temp rises from temperature T(8)=240° F. to temperature T(9)=246° F. Ideal Power Step 10 is then immediately applied at IPL4. During Ideal Power Step 10 the sizzle plates surface temp rises from temperature T(9)= 246° F. to temperature T(10)=250° F.

At this point the inverter is maintained in the off condition except for short duty cycle test pulses of the magnetic field to search for a proper load for a time period of MXDT. These short duty cycle (usually one cycle per 60 available) test pulses used to search for a suitable load atop the cooktop are implemented during the "standby" mode of operation and are standard operating procedure for most cooktops. Approximately 1 minute into MXDT the average surface temperature of the sizzle plate creeps up to 255° F. as the temperatures within the thickness of the cast iron walls of the sizzle plate equilibrate. After MXDT, the first in a sequence of Ideal Power Steps 11 is then immediately applied at IPL5. During Ideal Power Step 11 the sizzle plate's surface temperature rises from approximately 245° F. to 255° F. Immediately after the first application of Ideal Power Step 11, the inverter is again maintained in the "off" condition until a DT of (0.5)(MXDT), at which time Ideal Power Step 11 is again applied. Thereafter, as long as the sizzle plate remains upon the cooktop, Ideal Power Step 11 will be applied after a DT of (0.5)(MXDT). Should the sizzle plate be removed, the cooktop reverts to the standby mode and periodic low duty cycle test pulse production, where it will await an object with a suitable load impedance and a suitable RFID tag prior to leaving the standby mode and beginning another heating operation.

As illustrated in FIG. 5, the read/write transmissions between the RFID reader/writer and the RFID tag attached to the object occur during the time interval $\Delta t_{transmit}$ which occurs at the end of, but within, each time interval $\Delta t_{between\ transmit}$. Furthermore, a time period equal to $\Delta t_{between\ transmit}$ comprises the full time period of each Ideal Power Step. Any decrease in the number of "on" cycles of the inverter due to implementation of IPL2, IPL3, IPL4, or IPL5 will not reduce the existing inverter "off" period $\Delta t_{transmit}$, but can only add more "off" period.

The sequence of Ideal Power Steps described above is used as the blueprint to command the cooktop's operation during a heating operation of the sizzle plate, except that "ideal" power levels will be replaced within each Ideal Power Step by "corrected" power levels. However, to calculate the proper "corrected" power levels, the "ideal" power levels are stored in permanent memory for use in the calculations.

For the present sizzle plate example, there are 5 ideal power levels used under ideal operating conditions: IPL1 being the highest through IPL5 being the lowest. IPL1 is the power level for which the effective percentage of "on" time of the inverter is $\{(\Delta t_{between\ transmit} - \Delta t_{transmit})/(\Delta t_{between\ transmit})\}$, while the actual power magnetically coupled to the sizzle plate depends upon the factors discussed above. In this sizzle plate example, $\Delta t_{between\ transmit}$ equals 2.0 seconds, while $\Delta t_{transmit}$ equals 0.150 seconds. Thus, the effective percentage of inverter "on" time for LPL1 is 93%. To implement IPL1, the cooktop microprocessor (or the output port of the RFID coupler) will command the inverter to remain "on" (current is allowed to flow through the switching transistor(s) to the work coil) for 111 cycles out of 120, then maintains an "off" condition for the remaining 9 cycles. It is during those 9 "off" cycles that the transmit and receive operation of the RFID system occurs.

IPL2 is a power level with an effective percentage of inverter "on" time of 83%. Thus, to implement IPL2, the cooktop microprocessor (or the output port of the RFID coupler) will command the inverter to remain "on" (current is allowed to flow through the switching transistor(s) to the work coil) for 100 cycles out of 120, then maintains an "off" condition for the remaining 20 cycles. It is during the last 9 "off" cycles of those 20 "off" cycles that the transmit and receive operation of the RFID system occurs.

IPL3 is a power level with an effective percentage of inverter "on" time of 74%. Thus, to implement IPL3, the cooktop microprocessor (or the output port of the RFID coupler) will command the inverter to remain "on" (current is allowed to flow through the switching transistor(s) to the work coil) for 89 cycles out of 120, then maintains an "off" condition for the remaining 31 cycles. It is during the last 9 "off" cycles of those 31"off" cycles that the transmit and receive operation of the RFID system occurs.

IPL4 is a power level with an effective percentage of inverter "on" time of 65%. Thus, to implement IPL2, the cooktop microprocessor (or the output port of the RFID coupler) will command the inverter to remain "on" (current is allowed to flow through the switching transistor(s) to the workcoil) for 78 cycles out of 120, then maintains an "off" condition for the remaining 42 cycles. It is during the last 9"off" cycles of those 42 "off" cycles that the transmit and receive operation of the RFID system occurs.

IPL5 is a power level with an effective percentage of inverter "on" time of 55%. Thus, to implement IPL5, the cooktop microprocessor (or the output port of the RFID coupler) will command the inverter to remain "on" (current is allowed to flow through the switching transistor(s) to the workcoil) for 66 cycles out of 120, then maintains an "off" condition for the remaining 54 cycles. It is during the last 9 "off" cycles of those 54 "off" cycles that the transmit and receive operation of the RFID system occurs.

In order to implement "altering" formulas and instructions that will allow the HA(sizzle plate) to compensate for non-ideal power coupling, a cooktop circuit parameter representative of the actual power magnetically coupled to the sizzle plate under ideal coupling conditions is stored in permanent memory. The preferred storage location for this memory item is the RFID tag, but the cooktop's microprocessor memory or the additional memory device may be used.

The circuit parameter representative of the power coupled to the sizzle plate under IPL1 and ideal conditions may be chosen from many possibilities: the magnitude of the current that flows through the cooktop's switching transistor during inverter on times with the load coupled (hereafter referred to as $I_{transistor\ ideal}$), the magnitude of the resonant current during inverter on times with the load coupled (hereafter referred to as $I_{resonant}$), the magnitude of the rectified line current that flows from the commercial power supply to the switching transistors with the load coupled (hereafter referred to as $I_{line}$), or others. The cooktop circuit parameter representative of IPL1 is referred to as $I_{transistor\ max\ ideal}$ although it should be understood that any other cooktop circuit parameter that is indicative of the coupled power at IPL1 will suffice for this invention. Thus, the value of $I_{transistor\ max\ ideal}$ may be measured via a transformer through whose primary runs the current passing through one of the switching transistors during an average "on" cycle of the inverter and through whose secondary runs the induced current. This induced current is then rectified and fed to the cooktop's microprocessor control unit. The magnitude of this induced, rectified secondary current that corresponds the power coupled to the sizzle plate under IPL1 and ideal conditions will be stored in permanent memory location shown in Table 1 to be labeled as the value $I_{transistor\ max\ ideal}$.

Referring to FIG. 5, the average temperature of the food contacting surface of the sizzle plate versus time is superimposed on the graph depicting the sequence of Ideal Power Steps. At the end of each Ideal Power Step, the average temperature of the food contacting surface of the sizzle plate is measured and is stored in permanent memory. The value T(0) corresponds to the lowest normal operating temperature, which in the case of the sizzle plate is room temperature, 72° F. T(1), the temperature after Ideal Power Step 1, is 100° F. T(2), the temperature after Ideal Power Step 2, is 130° F. T(3), the temperature after Ideal Power Step 3, is 160° F. T(4), the temperature after Ideal Power Step 4, is 190° F. T(5), the temperature after Ideal Power Step 5, is 210° F. T(6), the temperature after Ideal Power Step 6, is 224° F. T(7), the temperature after Ideal Power Step 7, is 232° F. T(8), the temperature after Ideal Power Step 8, is 240° F. T(9), the temperature after Ideal Power Step 9, is 246° F. T(10), the temperature after Ideal Power Step 10, is the desired regulation temperature of 250° F.

The maximum delay time between identical power applications, referred to as MXDT, is the time between the conclusion of Ideal Power Step 10 and the beginning of the first application of Ideal Power Step 11. For the sizzle plate example, MXDT equals 120 seconds.

Figure 6:
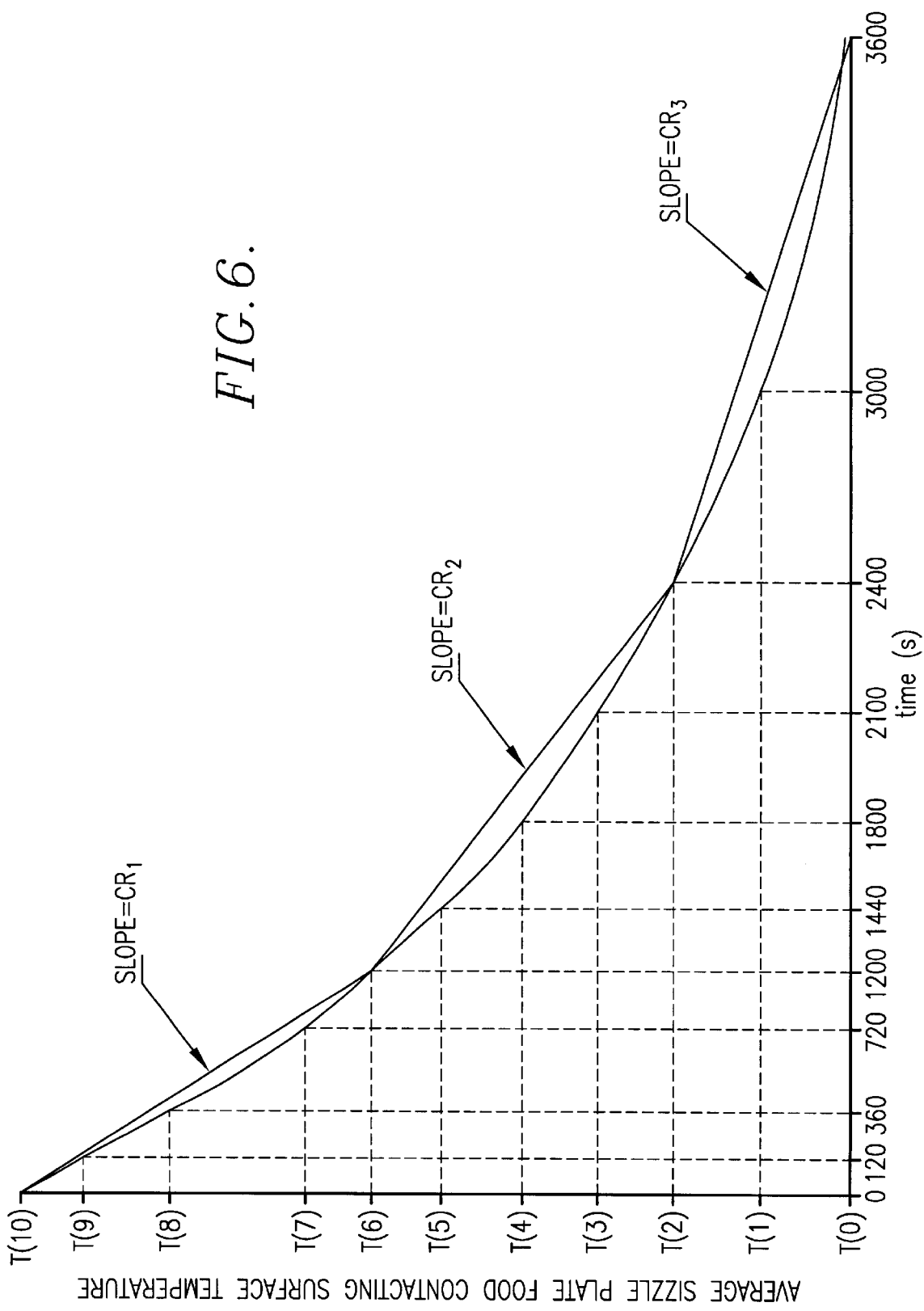
FIG. 6 is a graph of the average surface temperature of the FIG. 1 servingware versus time, illustrating an ideal cooling behavior.

In order to estimate the present temperature of the sizzle plate, the cooling behavior of the sizzle plate under ideal conditions is determined. Information from the resultant temperature/time curve is then later used in an "altering" step. FIG. 6 is a graph of the temperature/time profile of an average sizzle plate that has been removed from the cooktop after a successful charge to 250° F. and has been allowed to cool down under ideal conditions. This data plotted in this graph is gathered by simply using a sizzle plate with thermocouples attached to several locations on its food contact surface that has been heated to its desired regulation temperature and is subjected to "ideal" conditions during its cool down. Ideal conditions for the sizzle plate are those that most commonly occur during normal operations. In this instance: no food load for the first few minutes, a decreasing food load for the next 20 minutes, and then no food load for the next 40 minutes until the sizzle plate's average food contact surface temperature is again at room temperature. The sizzle plate has such a large surface area, high thermal conductivity, and high emissivity that an external food load may vary greatly without significantly affecting its temperature/time profile on cool down.

Once the data has been gathered and plotted, the times required for the sizzle plate to cool from temperature T(10) to temperatures T(9), T(8), T(0) are recorded. These times are shown in FIG. 6. Next, the cooling curve is modeled by three lines that intersect the actual cooling curve at temperatures among the group T(0) through T(9). In this example, the first linear segment, whose slope is designated as "cooling rate 1", $CR_1$, intersects the cooling curve at T(10) and at T(6). The second linear segment, whose slope is designated $CR_2$, intersects the cooling curve at T(6) and T(2). Finally, the third linear segment, whose slope is designated $CR_3$, intersects the cooling curve at T(2) and at T(0).

The more realistic the modeled cooling curve, the more accurate the deduced estimated present temperature, EPT, of the sizzle plate will be. Furthermore, the more deviation from an ideal thermal loading during cool down, the less accurate the deduced EPT. As will be seen, the proposed "altering" step designed to determine the sizzle plate's EPT is very conservative.

"Building Block" 2: "Altering Steps" Allowing HA(sizzle plate) to Operate Under Non-Ideal Conditions Inasmuch as a given sizzle plate will almost never operate under ideal conditions as described above, formulas and instructions, referred to as "altering steps", to be used within ideal algorithm are designed so that each sizzle plate heating operation will achieve its goal of arriving at 250° F. plus or minus 20° F. within 25 seconds of cooktop heating regardless of the initial conditions or working conditions of the sizzle plate. A myriad of non-ideal conditions maybe encountered in day-to-day operations. However, in any system the non-ideal conditions that make the most impact upon the outcome of the heating operation can normally be identified. In the sizzle plate example, "altering steps" are provided that attempt to correct for the following two non-ideal conditions:

1) non-ideal power coupling between cooktop and sizzle plate, and 2) starting the heating operation with the sizzle plate at a temperature different than room temperature.

In order to compensate for non-ideal power coupling, a cooktop circuit parameter representative of the actual power magnetically coupled to the sizzle plate under IPL1 and ideal coupling conditions is stored in permanent memory. This circuit parameter is $I_{transistor\ max\ ideal}$, having previously been determined through testing under ideal conditions.

Another value representative of the magnitude of the current flowing through the cooktop's switching transistor is measured at the beginning of each heating operation of the sizzle plate and is stored in "temporary memory" storage. This value will hereafter be referred to as $I_{transistor\ max\ actual}$. $I_{transistor\ max\ actual}$ is measured in the same manner as $I_{transistor\ max\ ideal}$ except that $I_{transistor\ max\ actual}$ is measured during a test pulse of magnetic field at the end of each standby mode of the cooktop and consequently, at the beginning of each heating operation.

The "beginning of each heating operation" means that the cooktop, having been previously in the standby mode of operation (where it was sending test pulses of magnetic field looking for a proper impedance load), has an object placed upon it which not only possesses a load impedance that causes a value of $I_{transistor\ max\ actual}$ within prescribed limits to be sensed, but also possesses an RFID tag that sends a proper identification signal to the RFID reader that is integrated into the cooktop's control circuitry. Both a proper load impedance and a proper RFID identity signal from the object are sensed by the cooktop prior to commencing induction heating of the object. A given sizzle plate may be removed and replaced from/upon the cooktop many times prior to reaching it's 250° F. temperature and yet, each time it is replaced, a new value of $I_{transistor\ max\ actual}$ will be stored in memory.

With this value of $I_{transistor\ max\ actual}$ available to the cooktop's microprocessor, a set of corrected power levels that use the ideal power levels as their baseline are calculated in real time at the very beginning of the heating operation. In this sizzle plate example, five corrected power levels are calculated in real time: corrected power level 1, CPL1, :corrected power level 2, CPL2, corrected power level 3, CPL3, corrected power level 4, CPL4, and corrected power level 5, CPL5. The following Table 3 illustrates the formulas used to calculate the percentage of inverter "on" time for each of these corrected power levels.

TABLE 3

| Corrected Power Level | Power Level Formula as Expressed in Percentage of Inverter "On" Time |
|---|---|
| CPL1 | CPL1 = {($\Delta t_{between\ transmit} - \Delta t_{transmit}$)/ ($\Delta t_{between\ transmit}$)} = 93% |
| CPL2 | CPL2 = (IPL2) * [($I_{transistor\ max\ ideal}$)$^2$/($I_{transistor\ max\ actual}$)$^2$] |
| CPL3 | CPL3 = (IPL3) * [($I_{transistor\ max\ ideal}$)$^2$/($I_{transistor\ max\ actual}$)$^2$] |
| CPL4 | CPL4 = (IPL4) * [($I_{transistor\ max\ ideal}$)$^2$/($I_{transistor\ max\ actual}$)$^2$] |
| CPL5 | CPL5 = (IPL5) * [($I_{transistor\ max\ ideal}$)$^2$/($I_{transistor\ max\ actual}$)$^2$] |

CPL1 is equal to IPL1 because all available coupled power is desired to begin the heating operation. Any formula to correct IPL1 could never provide for more coupled power than is available by using a 93% "on" time of the inverter. While CPL1 equals IPL1, each of the remaining CPL's may be either corrected to a higher percent "on" time or a lower percent "on" time than their respective IPL's.

The number of "on" cycles per $\Delta t_{between\ transmit}$ is then calculated in the manner described previously. Once calculated, the power level values and instructions to implement each power level of the cooktop are stored in temporary memory.

Once the values of CPL1 through CPL5 have been calculated at the beginning of each heating operation and these values are stored in temporary memory, they are used to implement the actual sequence of power steps, hereafter referred to as "Actual Power Steps". The sequence of Actual Power Steps is shown in Table 4 below.

TABLE 4

| Step Number | Command to CookTop |
|---|---|
| Actual Power Step 1 | Apply CPL1 for 2 sec* |
| Actual Power Step 2 | Apply CPL1 for 2 sec* |
| Actual Power Step 3 | Apply CPL1 for 2 sec* |
| Actual Power Step 4 | Apply CPL1 for 2 sec* |
| Actual Power Step 5 | Apply CPL2 for 2 sec* |
| Actual Power Step 6 | Apply CPL2 for 2 sec* |
| Actual Power Step 7 | Apply CPL3 for 2 sec* |
| Actual Power Step 8 | Apply CPL3 for 2 sec* |
| Actual Power Step 9 | Apply CPL4 for 2 sec* |
| Actual Power Step 10 | Apply CPL4 for 2 sec* |
| Time Period MXDT | Command CookTop into Standby Mode where 1 cycle test pulses check for load within impedance limits** |
| Actual Power Step 11 | Apply CPL5 for 2 sec** |
| Time Period (0.50)(MXDT) | Command CookTop into Standby Mode where 1 cycle test pulses check for load within impedance limits** |
| Actual Power Step 11 | Apply CPL5 for 2 sec** |

TABLE 4-continued

| Step Number | Command to CookTop |
| --- | --- |
| Time Period (0.50)(MXDT) | Command CookTop into Standby Mode where 1 cycle test pulses check for load within impedance limits** |
| Repeat Previous Two Steps Indefinitely** | |

*during the last 0.15 seconds of every Actual Power Step, the RFID reader/writer communicates with the RFID tag.
**The value of LKPS will never be assigned greater than the number 10. However, the actual time of completion of each Actual Power Step 11 will be used to update t(LKPS).

Therefore, all aspects of the sequence of Ideal Power Steps (duration of power steps, number of power steps, delay times, etc.) except the use of IPI's are followed. The goal of employing a sequence of Ideal Power Steps with CPL's inserted instead of IPL's is to ensure that virtually the same temperature/time curve that was shown superimposed in FIG. 5 will be achieved when the sequence of Actual Power Steps is followed under all other ideal operating conditions except ideal power coupling. Although the actual temperatures reached at the end of each Actual Power Step applied under otherwise ideal operating conditions may be unequal to T(1) through T(10) due to the inability to correct IPL1 for a lower power coupling efficiency, the respective temperatures reached would should never be higher and will be very close.

The procedures outlined above also correct for non-ideal line voltage of the commercial power supply, since $I_{transistor\ max\ actual}$ will also differ from $I_{transistor\ max\ ideal}$ due to this factor.

In order to enable the HA(sizzle plate) to bring the sizzle plate to the desired regulation temperature despite its actual temperature upon beginning the heating operation, first the present temperature is estimated and then the cooktop must begin the sequence of Actual Power Steps at the proper Actual Power Step. It is also assumed that the sizzle plate will never be cooled below room temperature. Should the sizzle plate be below room temperature when it is placed upon the cooktop, HA(sizzle plate) will bring it to a temperature lower than the desired 250° F., which is a safe outcome. It is also assumed that the sizzle plate will never be subjected to a heat source (other than food placed upon its upper surface) other than a cooktop of this invention.

The temperatures T(1) through T(10) that are assumed to be achieved after the completion of Actual Power Steps 1 through 10 are the same temperatures that are shown on FIG. 6 at various positions along the Ideal Cooling Curve. Corresponding to each of these temperatures T(0) through T(10) on the cooling curve is a time in seconds that was required for the fully heated sizzle plate to cool to the respective temperature. The first step in this portion of the heating algorithm HA(sizzle plate) designed to determine EPT is to assign a value to the temporary memory location designated as "n" that corresponds to the number of seconds required for the sizzle plate to cool from T(10) (the same temperature assumed to occur after Actual Power Step 11) to a given temperature among T(LKPS).

Table 5 below describes the means to assign values to "n". The value of "n" is assigned to variable memory immediately after the sizzle plate has been placed upon the cooktop and the first RFID tag transmission has transferred the values LKPS and t(LKPS) to the RFID reader/writer and thus to their respective temporary memory sites. Thus, based upon the value of LKPS retrieved from the RFID tag (remembering that a value higher than 10 is not allows to be stored as LKPS in the RFID tag's memory), the number of seconds required to cool from T(10) to the temperature T(LKPS), under ideal conditions, will be stored as "n".

TABLE 5

| If RFID Tag Value of LKPS at Beginning of Heating Operation Is | Then, assign value "n" = |
| --- | --- |
| If LKPS = 10 | then n = 0 |
| If LKPS = 9 | then n = 120 |
| If LKPS = 8 | then n = 360 |
| If LKPS = 7 | then n = 720 |
| If LKPS = 6 | then n = 1200 |
| If LKPS = 5 | then n = 1440 |
| If LKPS = 4 | then n = 1800 |
| If LKPS = 3 | then n = 2100 |
| If LKPS = 2 | then n = 2400 |
| If LKPS = 1 | then n = 3000 |
| If LKPS = 0 | then n = 3600 |

The second step in this portion of the heating algorithm HA(sizzle plate) designed to determine EPT is to determine the elapsed cooling time, ELCLT, and store its value in seconds into its temporary memory site. ELCLT is simply equal to the present time, Pt, as determined by the real-time clock or as reflected in the cooktop microprocessor's time clock, minus the time of completion of the Last Known Power Step applied, t(LKPS).

The final step in this portion of the heating algorithm HA(sizzle plate) designed to determine EPT is to follow the "if, then" statements as described in Table 6.

TABLE 6

If $6 \leq$ LKPS $\leq 10$, then:
    If $0 \leq$ ELCLT $\leq (1200 - n)$,
        then EPT = T(LKS) − [(CR$_1$) . (ELCLT)], and
    If $(1200 - n) <$ ELCLT $\leq (2400 - n)$,
        then EPT=T(LKS) − {[(CR$_1$).(1200 − n)] + [(CR$_2$).([ELCLT−(1200 − n)])}, and
    If $(2400 - n) <$ ELCLT $\leq (3600 - n)$,
        then EPT=T(LKS) − {[(CR$_1$).(1200 − n)] + [(CR$_2$).(1200)] + [(CR$_3$).([ELCLT−(2400 − n)]},
    and If $(3600 - n) <$ ELCLT,
        then EPT = T(0).
If $2 \leq$ LKPS $< 6$, then:
    If $0 \leq$ ELCLT $\leq (2400 - n)$,
        then EPT = T(LKS) − [(CR$_2$) . (ELCLT)], and
    If $(2400 - n) <$ ELCLT $\leq (3600 - n)$,
        then EPT=T(LKS) − {[(CR$_2$).(2400 − n)] + [(CR$_3$).([ELCLT−(2400 − n)])},

TABLE 6-continued and If $(3600 - n) <$ ELCLT,
   then EPT = T(0).
If $0 \leq$ LKPS $< 2$, then:
   If $0 \leq$ ELCLT $\leq (3600 - n)$,
      then EPT = T(LKS) $- [(CR_3) \cdot$ (ELCLT)], and
   and If $(3600 - n) <$ ELCLT,
      then EPT = T(0).

The formula to determine EPT therefore requires the values ELCLT, n, T(LKPS), and the linear cooling rates $CR_1$, $CR_2$, and $CR_3$. For example, for a LKPS value of 8 that is retrieved from the RFID tag attached to the sizzle plate, the corresponding value of EPT would be equal to $\{T(8)-[(CR_1)(Pt-t(8))]\}$.

Once EPT has been determined using the portion of the heating algorithm shown in Table 6, instructions are programmed into the cooktop's microprocessor that use this value of EPT to begin heating operations at the proper Actual Power Step of the sequence shown in Table 4. Table 7 below shows the instructions programmed into the cooktop's microprocessor so as to allow the beginning of the heating operation at an Actual Power Step commensurate with EPT. Should a value of EPT be calculated at the beginning of a given heating operation less than a given T(LKPS), tile cooktop will begin the heating operation at an Actual Power Step corresponding to the assumption that the sizzle plate may actually be very close to said T(LKPS). In this way, any the sizzle plate's actual regulation temperature should always less than or equal to the desired regulation temperature, which is the safest approach. For instance, should EPT be calculated to be a temperature greater than T(3) but less than T(4), the heating algorithm, HA(sizzle plate), will begin the heating operation at Actual Power Step 5.

TABLE 7

If EPT = T(0),
Then GO to Actual Power Step 1 and Complete the Remaining Sequence of Actual Power Steps;
If T(0) < EPT $\leq$ T(1),
Then GO to Actual Power Step 2 and Complete the Remaining Sequence of Actual Power Steps;
If T(1) < EPT $\leq$ T(2),
Then GO to Actual Power Step 3 and Complete the Remaining Sequence of Actual Power Steps;
If T(2) < EPT $\leq$ T(3),
Then GO to Actual Power Step 4 and Complete the Remaining Sequence of Actual Power Steps;
If T(3) < EPT $\leq$ T(4),
Then GO to Actual Power Step 5 and Complete the Remaining Sequence of Actual Power Steps;
If T(4) < EPT $\leq$ T(5),
Then GO to Actual Power Step 6 and Complete the Remaining Sequence of Actual Power Steps;
If T(5) < EPT $\leq$ T(6),
Then GO to Actual Power Step 7 and Complete the Remaining Sequence of Actual Power Steps;
If T(6) < EPT $\leq$ T(7)
Then GO to Actual Power Step 8 and Complete the Remaining Sequence of Actual Power Steps;
If T(7) < EPT $\leq$ T(8),
Then GO to Actual Power Step 9 and Complete the Remaining Sequence of Actual Power Steps;
If T(8) < EPT $\leq$ T(9),

TABLE 7-continued

Then GO to Actual Power Step 10 and Complete the Remaining Sequence of Actual Power Steps;
If T(9) < EPT $\leq$ T(10),
Then GO to Actual Power Step 11 and Complete the Remaining Sequence of Actual Power Steps;

"Building Block 3: "Temporary Memory" Data Sites and the Means To Input Current Information Into Each Site As noted above, several pieces of information are either retrieved from the RFID tag attached to the sizzle plate or determined from measurements made by the cooktop's circuit sensors to allow the HA(sizzle plate) to operate correctly. Most of these required pieces of information, the means to determine them, and the names given them have been described. Table 8 lists each of these required data items that must be stored in a temporary memory site accessible to the cooktop's microprocessor.

TABLE 8

| Information | Code Identifier |
|---|---|
| 1) Last Known Power Step of Heating Algorithm Applied | LKPS |
| 2) Time at end of Last Known Power Step of the Heating Algorithm Applied | $t_{(LKPS)}$ |
| 3) Temperature at end of Last Known Power Step | $T_{(LKPS)}$ |
| 4) Elapsed cooling time = $(Pt - t_{(LKPS)})$ | ELCLT |
| 5) Estimated present temperature | EPT |
| 6) Delay time between repeats of Actual Power Step 11 | DT |
| 7) Corrected power level 1 (% inverter "on" time) | CPL 1 |
| 8) Corrected power level 2 (% inverter "on" time) | CPL 2 |
| 9) Corrected power level 3 (% inverter "on" time) | CPL 3 |
| 10) Corrected power level 4 (% inverter "on" time) | CPL 4 |
| 11) Corrected power level 5 (% inverter "on" time) | CPL 5 |
| 12) Magnitude of the current that flows through the cooktop's switching transistor during a test pulse with inverter "on" during the cooktop's standby mode of operation | $I_{transistor\ max\ actual}$ |
| 13) Present time (as determined from real time clock or from cooktop's microprocessor clock) | Pt |
| 14) Number of seconds required to cool from T(10) to a Temperature corresponding to the conclusion of a given Actual Power Step | n |

Implementing the Overall Software Algorithm and HA(Sizzle Plate)

Figure 7:
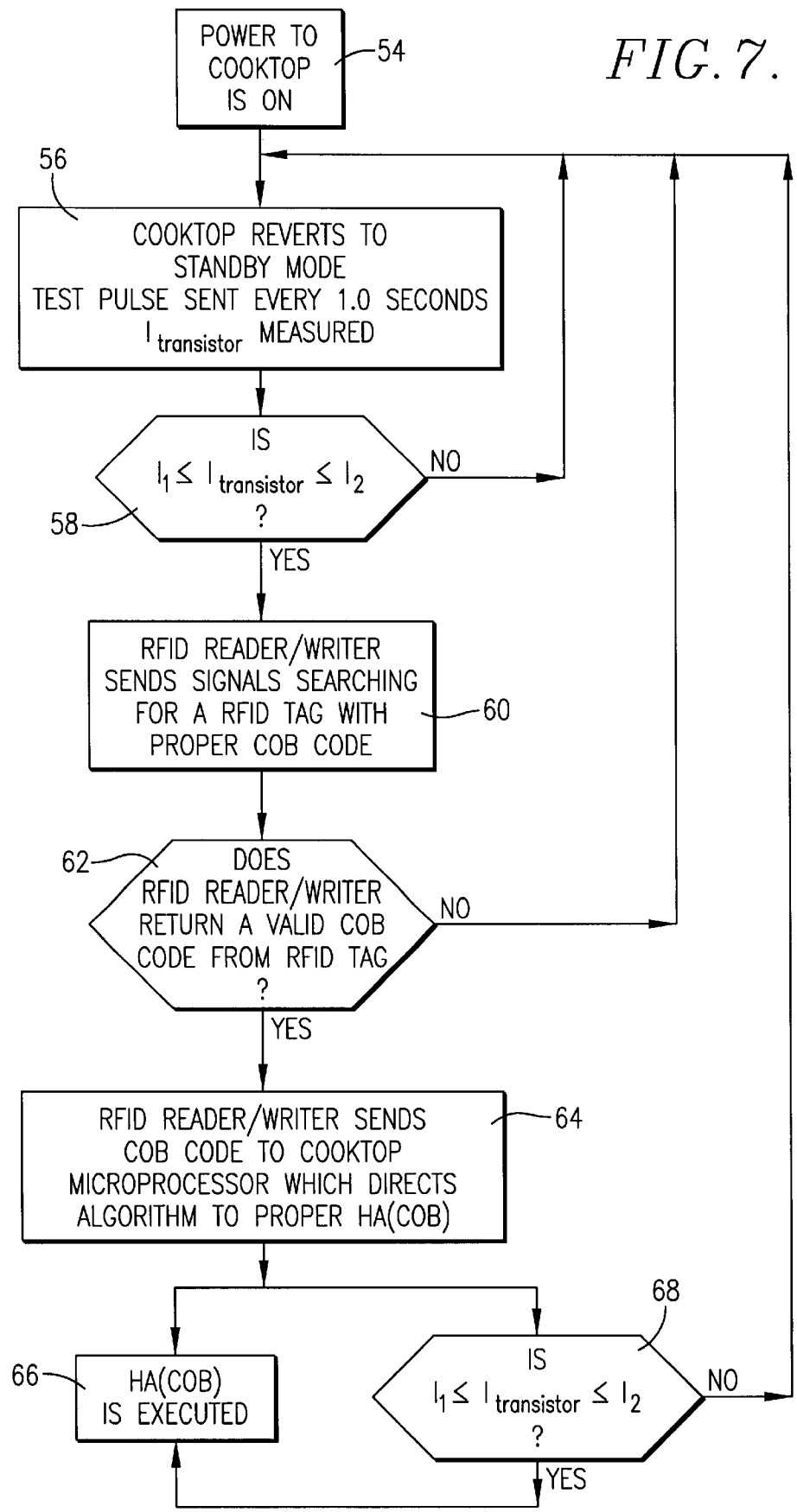
FIG. 7 is a flow chart of a preferred overall software algorithm for the heating device of the invention.

FIG. 7 is a flow chart showing the preferred overall software algorithm, which operates to direct the cooktop to access HA(sizzle plate), assuming that at least the three mandatory items of information set forth in Table 9 below are stored in the RFID tag's memory.

TABLE 9

MANDATORY INFORMATION

| Information | Code Initials | Bytes Required on Ario 40-SL Tag |
|---|---|---|
| 1) Class of Object | COB | 1 |
| 2) Last Known Power Step of Heating Algorithm | LKPS | 1 |
| 3) Time of Last Known Power Step of Algorithm | t(LKPS) | 4 |

OPTIONAL INFORMATION

Figure 10:
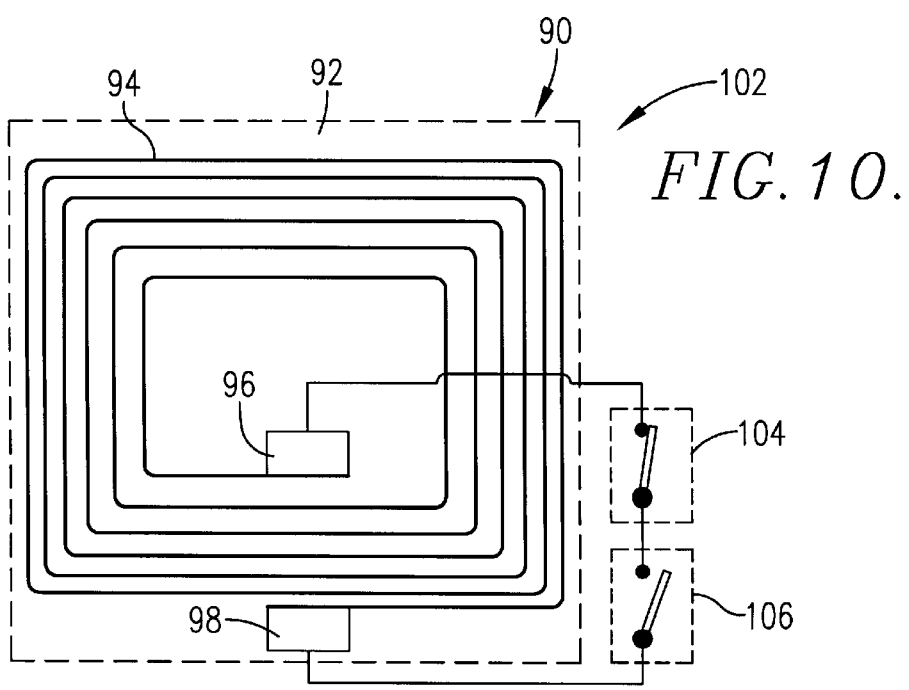
FIG. 10 is a schematic representation similar to that of FIG. 9 but illustrating an RFID antenna with two series-attached thermal switches.

| Information | Code Initials |
|---|---|
| 13) Any of the "Permanent Memory" variables 1–22 as described in FIG. 10 | Same as in FIG. 10 |
| 14) |  |
| 15) |  |
| 16) Total Number of Full Heating Cycles this RFID tag has completed | # CYCLES |
| 17) |  |
| 18) |  |
| 13) 19) 3) Actual Temperature that a first Temperature Switch Connected to RFID tag actuates during temp rise | TS1 |
| 20) |  |
| 21) |  |
| 22) 4) Actual Temperature that a second Temperature Switch Connected to RFID tag actuates during temp rise | TS2 |
| 23) |  |
| 24) |  |
| 25) 5) Elapsed time between TS1 and TS2 for an ideal cooling load | TS1/TS2_time |
| 26) |  |
| 27) |  |
| 28) |  |
| 13) 29) NOTE: These items are preferred for the alternative embodiments wherein one or more temperature switches are connected to the RFID tag. |  |
| 30) |  |

The first of the three needed items of information is "Class of Object, or COB. This item of information is permanently stored in the RFID tag's microprocessor memory and will never be rewritten over with information from the cooktop's RFID reader/writer. For a RFID tag affixed to a sizzle plate, the COB digital code will be unique to the class of sizzle plates. For a different class of object, say for instance a dinner plate, a different digital code will exist on its RFID tag. The COB may or may not also include a portion of code that further identifies its attached sizzle plate uniquely from all other sizzle plates.

The other two items of needed information, Last Known Power Step of Heating Algorithm, LKPS, and Time of Last Known Power Step of Algorithm, t(LKPS), have corresponding memory sites in temporary memory of HA(sizzle plate) (and, for other classes of objects, in corresponding temporary memory sites of those HA(COB)'s). LKPS and t(LKPS) will be programmed as 0's on a newly manufactured RFID tag attached to a brand new sizzle plate. Thereafter, these values will be re-written to periodically by the RFID reader/writer.

Table 9 also sets forth optional information that may be stored on the RFID tag. For instance, any of the "Permanent Memory" variables may be stored on the RFID tag. Furthermore, the total number of full heating cycles that the RFID tag has completed may be stored. This information could be employed to allow the user to be notified when it is time to replace the tag.

Referring to FIG. 7, the overall control algorithm operates as follows, assuming that the power to the cooktop is "on", Step 54. First, the cooktop reverts to standby mode, Step 56, and a test pulse is sent every second in order to determine whether an object is placed on the cooktop; for this purpose, $I_{transistor}$ is measured at each pulse using the sensor 31 for this purpose. Next, in Step 58, it is determined whether $I_{transistor}$ is greater than or equal to $I_1$ and less than or equal to $I_2$ (these current values are pre-set for the particular cooktop, based upon it's efficiency at low and high transistor currents). Also, all temporary memory items in microprocessor memory as set forth in Table 8 are given zero values, except for Pt (present time) which always contains the current time registered on the real time clock or the microprocessor's time base. If the answer to query 58 is "no", meaning that no suitable induction heatable object is on the cooktop, the program reverts back to Step 56. If the answer in Step 58 is "yes", the program proceeds to Step 60 where the RFID reader/writer sends a signal to search for a reply from a compatible RFID tag. In the following Step 62, a determination is made whether the RFID reader/writer receives a valid COB code from an RFID tag. If the answer to this question is "no" (which may occur, e.g., when a cast iron plate without an RFID tag is placed on the cooktop), the program reverts back to Step 56 and the cooktop remains in its standby mode. Thus, no unwanted object will ever be heated to any significant extent.

If a valid COB code is received, the answer in Step 62 is "yes", and the program then proceeds to Step 64 whereupon the reader/writer sends the appropriate COB code to the cooktop microprocessor; this directs the software algorithm to the proper HA(COB), in this case HA(sizzle plate). During the course of execution of HA(sizzle plate), Step 66, the cooktop continues to periodically measure the load impedance and ensure that it is within limits, as reflected in Step 68. As long as the value of $I_{transistor}$ is within the boundary limits, the algorithm steps of HA(sizzle plate) will continue in order. However, should the value of $I_{transistor}$ fall outside these limits (such as would occur when the sizzle plate is removed from the cooktop), the algorithm will exit HA(sizzle plate) and the overall algorithm of FIG. 7 will return to Step 56 where the cooktop is in standby mode.

Attention is next directed to FIG. 8 which illustrates the important algorithm instructions for HA(COB), and in particular HA(sizzle plate). In this discussion, it is assumed that Step 64 of FIG. 7 has initiated the FIG. 8 algorithm, and further that a new sizzle plate at room temperature is placed upon the heating device, and is maintained there through 2 Actual Power Steps 11. Therefore, in Step 70, when the reader/writer interrogates the RFID tag on the sizzle plate, LKPS and t(LKPS) will have zero values, and the temporary memory locations corresponding to LKPS and t(LKPS) within HA(sizzle plate) will receive zero values. Next, in Step 72, the value $I_{transistor}$ is measured and stored in the HA(sizzle plate) temporary memory location of $I_{transistor\ max\ actual}$ (at this time the cooktop is still in its standby mode). Using the formulas set forth in Table 3, the CPL's for the heating operation are calculated, Step 74. If the user placed the sizzle plate in its proper location on the cooktop, these CPL values should be nearly equal to their corresponding IPL values. At Step 76, a value of 3600 is assigned to n, since LKPS is equal to zero. In Step 78, the value of ELCLT is calculated to be much greater than 3600 seconds and is stored in temporary memory. Next, in Step 80, EPT is calculated as equal to T(0) or 72° F. This value of EPT is also stored in temporary memory. In Step 82, using this stored EPT value, the cooktop microprocessor will follow the instructions set forth in Table 7 and will start the sequence of Actual Power Steps as described in Table 4, at Actual Power Step 1.

In Step 84, the cooktop is instructed to complete all remaining Actual Power Steps (1–10 and the two 11's). At the end of each Actual Power Step, the RFID reader/writer will transmit the value of LKPS just completed (up to the value 10). For example, at the end of Actual Power Step 1, during the time interval $\Delta t_{transmit}$, the RFID reader/writer will transmit the value 1 as LKPS and the RFID tag will store that value in its memory location dedicated to LKPS. Simultaneously, the RFID reader/writer will also transmit the time of transmission, preferably in UTC format. This information is stored in the RFID tag's memory location set aside for t(LKPS). At the end of each successive Actual Power Step, the RFID tag's memory locations set aside for LKPS and t(LKPS) will receive two new values.

It will also be seen that in Step 84 the query of step 68 (FIG. 7) is repeated, assuring that $I_{transistor}$ is between $I_1$ and $I_2$; so long as this obtains, Step 84 continues and the remaining Actual Power Steps are carried out. However, if the answer to the Step 68 query is "no", the temporary memory values are set to zero (Step 86) and the software reverts to the standby (i.e., inverter off except for test pulses) mode of Step 56, FIG. 7.

In this scenario, the sizzle plate is not removed from the cooktop until it has completed two applications of Actual Power Step 11, and therefore the plate will have achieved its desired regulation temperature of 250° F.±20° F. Once removed, the plate's RFID tag will have the following information stored in its memory: LKPS=10, t(LKPS)=the time at which the second application of Actual Power Step 11 was completed, COB=sizzle plate. Inasmuch as the highest value of LKPS allowed is 10, while the RFID tag's memory is updated with t(LKPS) to reflect the time of the last application of an Actual Power Step 11, the sizzle plate is armed with information concerning its past charging history.

It is next assumed that the sizzle plate is served to a customer, is thereafter washed and shelved, and is again placed on the cooktop after a time period of 60 minutes, but is removed after 6 seconds. As noted above, the plate's RFID tag memory will have a value of 10 for LKPS and a value of t(LKPS) that corresponds to the end of the application of the second Actual Power Step 11 an hour prior to the time that the RFID reader/writer interrogates the RFID tag in Step 70, FIG. 8.

Therefore, the temporary memory location corresponding to LKPS and t(LKPS) within HA(sizzle plate) and accessible to the cooktop's microprocessor will receive those values of 10 and the value of t(LKPS) just described. Next, at Step 72, at the time of the next test pulse of the magnetic field from the cooktop (at this time the cooktop is still in it's standby operating mode), the value of $I_{transistor}$ will be measured and stored in the HA(sizzle plate) temporary memory location of $I_{transistor\ max\ actual}$. Using the formulas found in Table 3, the CPL's for this heating operation will be calculated at Step 74. Should the user have placed the sizzle plate in its proper location atop the cooktop, these values of CPL should be nearly equal to their corresponding IPL values. At Step 76 the value of 0 will be assigned to n, since LKPS is equal to 10. At Step 78, the value of ELCLT will be calculated to be equal to 3600 seconds and will be stored in temporary memory. Thus, at Step 80, the value of EPT will be calculated (via the instructions of Table 6) to be equal to T(0) or 72° F. This value of EPT will be stored in temporary memory. Using this stored value of EPT, the cooktop's microprocessor will follow the instructions as described in Table 7 and will start the sequence of Actual Power Steps, as described in Table 4, at Actual Power Step 1.

Step 84 instructs the cooktop to complete all remaining Actual Power Steps (1 through 10 and 11's). At the end of each Actual Power Step, the RFID reader/writer will transmit the value of LKPS that it just completed (not to exceed the value 10). For instance, at the end of Actual Power Step 4, during the time interval $\Delta t_{transmit}$, the RFID reader/writer will transmit the value 4 as LKPS and the RFID tag will store that value in its memory location dedicated to LKPS. Simultaneously, the RFID reader/writer will also transmit the time of day of the transmission. This information will be stored in the RFID tag's memory location set aside for t(LKPS). At the end of each successive Actual Power Step, the RFID tag's memory will receive two new values for LKPS (up to the value 10) and t(LKPS).

In view of the fact that the sizzle plate is removed from the cooktop after 6 seconds, it will have just completed the application of Actual Power Step 3. Thus, it will have reached a temperature of approximately T(3). Furthermore, it's RFID tag will now have the following information stored in its memory when removed from the cooktop: LKPS=3, t(LKPS)=the time at which the application of Actual Power Step 3 was just completed, COB=sizzle plate. Thus, the sizzle plate will be armed with information concerning its past charging history and will be ready to be placed upon the charger again.

If it is next assumed that the sizzle plate at approximately temperature T(3) is immediately placed again upon the cooktop, the sizzle plate will have the value 3 for LKPS and a value of t(LKPS) that corresponds to the end of the application of the second Actual Power Step 3. Assuming that the value of t(LKPS) matches that of the microprocessor once it is replaced upon the cooktop, at Step 70 the temporary memory location corresponding to LKPS and t(LKPS) within HA(sizzle plate) and accessible to the cooktop's microprocessor will receive those values of 3 and the value of t(3) just described. Next, at Step 72, at the time of the next test pulse of the magnetic field from the cooktop (at this time the cooktop is still in it's standby operating mode), the value of $I_{transistor}$ will be measured and stored in the HA(sizzle plate) temporary memory location of $I_{transistor\ max\ actual}$. Using the formulas found in Table 3, the CPL's for this heating operation will be calculated at Step 74. Should the user have placed the sizzle plate in its proper location atop the cooktop, these values of CPL should be nearly equal to their corresponding IPL values. At Step 76, the value of 2100 will be assigned to n, since LKPS is equal to 3. At Step 78, the value of ELCLT will be calculated to be equal to 1 second or so and will be stored in temporary memory. Thus, at instruction Step 80, the value of EPT will be calculated (via the instructions of Table 6) to be equal to a temperature slightly less than T(3) but more than T(2). This value of EPT will be stored in temporary memory. Using this stored value of EPT, the cooktop's microprocessor will follow the instructions as described in Table 7 and will start the sequence of Actual Power Steps, as described in Table 4, at Actual Power Step 4.

Step 84 instructs the cooktop to complete all remaining Actual Power Steps (Step 4 through 10 and into 11's). At the end of each Actual Power Step, the RFID reader/writer will transmit the value of LKPS that it just completed (up until it reaches the value 10). For instance, at the end of Actual Power Step 4, during the time interval $\Delta t_{transmit}$, the RFID reader/writer will transmit the value 4 as LKPS and the RFID tag will store that value in its memory location dedicated to LKPS. Simultaneously, the RFID reader/writer will also transmit the time of day of the transmission. This information will be stored in the RFID tag's memory location set aside for t(LKPS). At the end of each successive Actual Power Step, the RFFD tag's memory will receive two new values for LKPS (not to exceed 10) and t(LKPS).

In this scenario the cooktop will maintain the sizzle plate at approximately 250° F. indefinitely. The value of LKPS in the RFID memory will continue to remain at 10 and the value of t(LKPS) will continually be updated at the end of each Actual Power Step 11.

Figure 9:
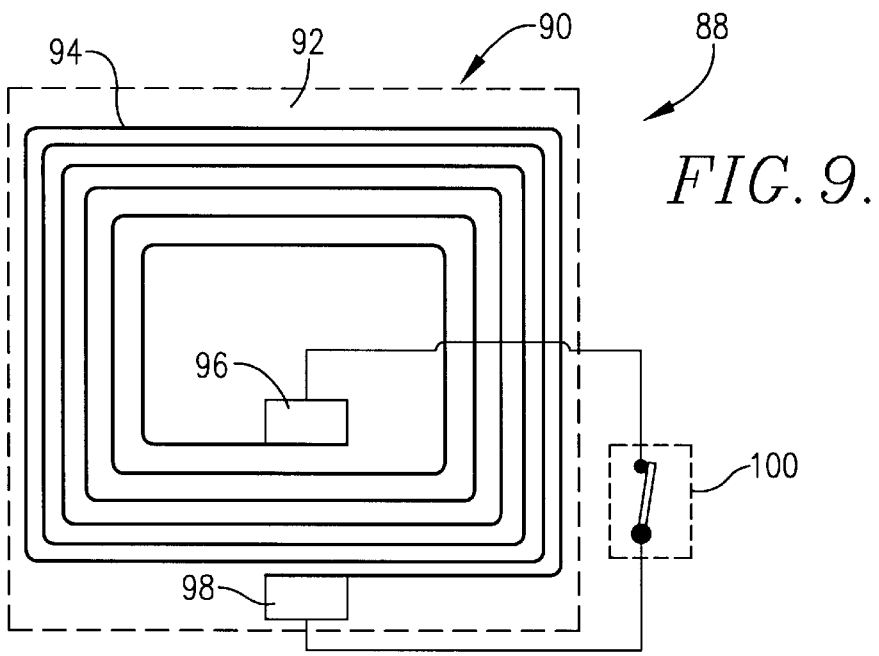
FIG. 9 is a schematic representation of an RFID antenna with one thermal switch attached.

As previously described, the servingware sizzle plate 22 depicted in FIG. 1 may include, as an additional feature, a thermal switch 52. In addition, FIGS. 9 and 10 illustrate RIFD tags with one and two thermal switches, respectively. In the case of the FIG. 1 embodiment, the thermal switch 52 is preferably in contact with the undersurface of the cast iron plate 46.

The purpose of a thermal switch in this context is to alter the transmission of data from the tag in some fashion at the specific temperature wherein the thermal switch activates so that the RFID reader will receive different information from the tag after the thermal switch has activated than was received prior to such activation. In essence, the combination of one or more thermal switches and a RFID tag becomes a switch itself that can transmit a radio frequency reply signal to the RFID reader/writer whereby the RFID reader/writer knows that the switching action has occurred. However, this new combination switch is "intelligent" because it can also store all of the digital information as described in the preferred embodiment, information that can be read and updated by the RFID reader/writer.

Turning next to FIG. 9, a combined RFID tag/thermal switch composite 88 is illustrated. In this instance, the RFID tag 90 is a Gemplus ARIO 40-SL Stamp, made up of an epoxy base 92 with an engraved copper antenna 94 thereon. The antenna 94 is connected to an integrated circuit (not shown in FIG. 9 owing to the fact that it is on the reverse face of the tag). The copper antenna 94 terminates at two "termination plates" 96 and 98, which are rectangular pieces of copper much larger in dimension than the rest of the antenna lines. This ARIO 40-SL Stamp architecture, the same as that of the ARIO 40-SM Module and the smaller ARIO 40-SMD, makes connecting a thermal switch a simple task. However, any RFID tag is suitable for making a composite in accordance with the invention, because all such tags contain both an antenna and integrated circuit.

The other component of the RFID tag/thermal switch composite or "intelligent switch" is the thermal switch 100 itself. Any prior art switch that changes from open contacts to closed, or from closed contacts to open at a pre-set or variable temperature will be suitable. Appropriate switches have the following characteristics: small size, moldability, high operating temperature, ability to operate in magnetic fields, small tolerance of pre-set switching temperature, and narrow differential. A thermal switch that is factory set to go from open contact to closed at a temperature of 150° F. with a tolerance of ±5° F. will go to closed contacts somewhere between 145° F. and 155° F. However, after switching closed, it will remain in closed contact for some finite time, and thus finite temperature range, until it cools down to a temperature at which the switch re-opens. This finite temperature range is termed the differential. For instance, a perfect 150° F. (normally open) switch as described above with a 40° F.±20° F. differential will re-open no earlier than 130° F. and could cool as low as 90° F. before re-opening.

The preferred thermal switch 100 for use in this invention is a miniature bi-metal thermostat, sometimes often called a thermal protector. These are commonly used for either control purposes or for temperature limiting purposes. They may be purchased in either of two configurations: 1) (normally open) close on rise, or 2) (normally closed) open on rise. The preferred switch model for this invention is the 5003 series miniature bi-metal thermostat manufactured by Airpax® Thermal Sensing Products. This thermostat has a 15° F. differential for the switching temperature ranges of interest for this invention. Other suitable thermal switches include the Klixon® line of bi-metal snap action thermostats manufactured by Texas Instruments, the Airpax series 6600 miniature bi-metal snap action thermostat, and the OP6 and UP7 series bi-metal thermal protectors manufactured by UCHIYA and sold by Selco Products Company of California. These latter mentioned switches, though smaller than the 5003 series, typically have a 50° F. differential.

It has been found experimentally that the simplest method to turn an RIFD tag into an intelligent radio frequency switch or composite is to connect each end of thermal switch to a respective end of the antenna at termination plates 96 and 98. A simple solder joint is sufficient. Of course, this connection may be done as a post-production process by the user, or by the RFID tag manufacturer.

When a single thermal switch 100 is connected in this fashion, it should be a (normally open) close on rise switch. This allows the RFID tag to communicate normally with the RFID reader at temperatures below the switching temperature (hereafter referred to as TS1) because the antenna 94 maintains its original impedance characteristics. At temperatures above TS1 the thermal switch 100 is closed. This short circuits the antenna 94, changing its impedance characteristics, and prevents it from communicating with the RIFD reader/writer. Of course, during the "differential" temperature range that exists during cool-down for a bi-metal thermostat (for instance, 15° F. below TS1 for an Airpax 5003 series thermostat) the RFID antenna 94 configured as shown in FIG. 9 will be unable to communicate with the RFID reader/writer. For a thermal switch 100 with a small differential, this fact does not detract greatly from the accuracy and precision of the alternative temperature regulation method described below. However, for a higher differential thermal switch, the much greater temperature range of "muteness" is a detriment.

FIG. 10 depicts a RFID tag/thermal switch composite 102 which overcomes the "muteness" problem which may be caused by a single bi-metallic switch with a large differential. The composite 102 includes an identical RFID tag 90 having base 92, antenna 94 and plates 96, 98. However, in this instance two series-related thermal switches 104, 106 are connected as shown to the termination plates. The switch 106 is a normally open, close on rise switch, while the other switch 104 is a normally closed open on rise switch. The switch 106 should have a switching temperature TS1, lower than the switching temperature TS2 of the normally closed switch 104. Thus, during heat-up, prior to TS1, the RFID tag can communicate normally with the RFID reader. Between TS1 and TS2, the RFID tag cannot communicate with the RFID reader. Above, TS2 communications are normal again. During cool-down, the "muteness" temperature period is no longer the differential of a single bi-metal thermostat, but is now the difference in temperature between TS1 and TS2. This temperature interval may be chosen by the designer to be small if the value of TS2 is chosen as the regulation temperature. However, a larger temperature interval between TS1 and TS2 can also be chosen and used to compensate for non-ideal cooling loads, if TS1 is chosen as a calibration temperature and not as the regulation temperature.

Despite the fact that the simplest way to connect one or more thermal switches to an RFID tag so as to provide an "intelligent" switch or composite is to connect them so as to short out the antenna, it is also possible to connect one or more thermal switches to the RFID tag so as to short out only the EEPROM section of the tag. In this connection mode, the RFID tag would have full communication ability, i.e. the ability to read and write, with the RFID reader/writer below the switch temperature TS1 (or above TS2 for the dual switch configuration). However, above TS1 (or between TS1 and TS2 for the dual switch configuration) the tag would behave as a read-only tag. Thus the RFID reader/writer, and therefore the induction heating device of this invention, would be able to read information from the object such as its COB at all times that the tag is in the reader/writer's field. Other connection methods can also be used. Regardless of the means or location of connection of the thermal switch (es), the RFID reader/writer will be able to detect a difference between a tag whose switch or switches are in one condition versus the other.

In the following discussion, use of a composite 88 as shown in FIG. 9 or a dual-switch composite 102 as depicted in FIG. 10 will be explained. Thus, the RFID tag/thermal switch combination will appear to the RFID reader/writer as if no tag is present in the field during it's "altered" state (when one or more thermal switches shorts the RFID antenna as in FIGS. 9 and 10) but appears as a normal read/write RFID tag otherwise. During the "altered state" of the RFID tag/thermal switch composites, no communications between the tag and reader will be possible. However, the alternative methods described below will work for other RFID tag/thermal switch composites wherein the RFID tag is still communicative during an altered state as well.

Temperature Regulation Employing Information Transmitted from an RFID Tag Coupled With One or More Temperature Switches, Wherein the Temperature Switch or Switches Define the Regulation Temperature Considering first the apparatus shown in FIG. 1, with the servingware 22 having a single thermal switch 52, an exemplary switching temperature of the switch 52 (TS1) is selected to be equal to T(10), the pre-programmed regulation temperature shown in FIG. 5. The overall software algorithm of FIG. 7 also allows the use of such a construction without change. However, changes are made in the software HA(COB), in this case HA(sizzle plate). Therefore, upon power up of the induction heating device, all steps in FIG. 7 will be followed as previously described. It is only within Step 66, where the HA(COB) is executed, that the microprocessor follows a different algorithm.

The class of object (COB) code on the RFID tag that has one thermal switch attached will direct the induction heating device's microprocessor controller to follow the HA(COB with 1 Thermal Switch Defining the Regulation Temperature) that is shown schematically in FIG. 11. This FIG. 11 flow chart has only one difference from that of FIG. 8, namely in Step 84a. The difference is simply this: if, during any read/write operation made during the last 0.15 seconds of a power step, an "altered state" RFID tag is detected, then the program reverts to the Standby Mode of Operation through Steps 86 and 56 for a period of time equal to (0.5)(MXDT) whereupon the program then moves to Actual Power Step 11.

In order to make this difference clear, assume that the sizzle plate with the attached RFID tag/thermal switch composite (whose switch temperature, TS1, coincides with T(10)) is placed upon the induction heating device 20. Assume that the RFID tag is new. Referring to FIG. 7, the cooktop microprocessor will begin implementing HA(Sizzle Plate with 1 Thermal Switch Defining the Regulation Temperature) at Step 66. Referring to FIG. 11, the sizzle plate will have zero values for LKPS and t(LKPS) when the RFID reader/writer interrogates the RFID tag in Step 70. Therefore, the temporary memory location corresponding to LKPS and t(LKPS) within HA(Sizzle Plate with 1 Thermal Switch Defining the Regulation Temperature) and accessible to the cooktop's microprocessor will receive zero values. Next, at Step 72, at the time of the next test pulse of the magnetic field from the cooktop (at this time the cooktop is still in it's standby operating mode), the value of $I_{transistor}$ will be measured and stored in the HA(Sizzle Plate with 1 Thermal Switch Defining the Regulation Temperature) temporary memory location of $I_{transistor\ max\ actual}$. Using the formulas found in Table 3 the CPL's for this heating operation will be calculated at Step 74. Should the user have placed the sizzle plate in its proper location atop the cooktop, these values of CPL should be nearly equal to their corresponding IPL values. At Step 76, the value of 3600 will be assigned to n, since LKPS is equal to 0. At Step 78, the value of ELCLT will be calculated to be much greater than 3600 seconds and will be stored in temporary memory. Thus, at Step 80, the value of EPT will be calculated (via the last two lines of Table 6) to be equal to T(0) or 72° F. This value of EPT will be stored in temporary memory. Using this stored value of EPT, the cooktop's microprocessor will follow the instructions as described in Table 7, and will start the sequence of Actual Power Steps, as described in Table 4, at Actual Power Step 1.

Step 84a (FIG. 11) instructs the cooktop to complete all remaining Actual Power Steps (1 through 10 and 11's). At the end of each Actual Power Step, the RFID reader/writer will transmit the value of LKPS that it just completed (up to the value 10). However, there is one possible difference between mode of operation and that described previously in connection with FIG. 8. As the sizzle plate reaches the end of Actual Power Step 10 and attempts to write a new value of LKPS and t(LKPS) to the RFID tag, it may find that the RFFD tag does not communicate back because it is in an altered state. This would be the case if the thermal switch reached TS1 prior to the end of Actual Power Step 10 (in the case that the end of Actual Power Step 10 is reached prior to TS1, the cooktop would behave exactly as if the RFID tag had no thermal switch attached to it at all). Assuming that this occurs, then the RFID reader/writer would know that the sizzle plate is still on the charger because the answer the question in Step 68 is still "yes". Therefore, the cooktop microprocessor will follow the instructions of Step 84a and will cause the cooktop to revert to Standby mode for a period of time equal to (0.5)(MXDT). At that time the cooktop would apply Actual Power Step 11, whereby, according to Table 4, it would apply CPL5 for 2 seconds. However, during the last 0.15 seconds of CPL5, the reader/writer would again determine the RFID tag to be in an altered state, and would thus repeat the (0.5)(MXDT) period and application of Actual Power Step 11 for the second time.

Since, in this case the sizzle plate will not be removed from the cooktop until it has completed two applications of Actual Power Step 11, it will have achieved its desired regulation temperature of 250° F.±20° F. However, unlike in the FIG. 8 method, it's RFID tag will have the following information stored in its memory: LKPS=9, t(LKPS)=the time at which Actual Power Step 9 was last completed, COB=sizzle plate with 1 Thermal Switch Defining the Regulation Temperature. Thus, the sizzle plate will be armed with information concerning its past charging history and will be ready to be placed upon the charger again.

Assume next that the sizzle plate is used for customer service and is then washed and shelved, and is thereupon placed again on the cooktop for a time period of 60 minutes and is removed after 6 seconds. In this case the sizzle plate will have the value 9 for LKPS and a value of t(LKPS) that corresponds to the end of the application of Actual Power Step 9. This value of t(LKPS) is a little over an hour prior to the time that the RFID reader/writer interrogates the RFID tag in Step 70. Therefore, the temporary memory location corresponding to LKPS and t(LKPS) within HA(Sizzle Plate with 1 Thermal Switch Defining the Regulation Temperature) and accessible to the cooktop's microprocessor will receive those values of 9 and the value of t(LKPS) just described. Next, at Step 72, at the time of the next test pulse of the magnetic field from the cooktop (at this time the cooktop is still in it's standby operating mode), the value of $I_{transistor}$ will be measured and stored in the HA(Sizzle Plate with 1 Thermal Switch Defining the Regulation Temperature) temporary memory location of $I_{transistor\ max\ actual}$. Using the formulas found in Table 3, the CPL's for this heating operation will be calculated at Step 74. Should the user have placed the sizzle plate in its proper location atop the cooktop, these values of CPL should be nearly equal to their corresponding IPL values.

At Step 76 the value of 120 will be assigned to n, since LKPS is equal to 9. At Step 78 the value of ELCLT will be calculated to be equal to, say, 3700 seconds and will be stored in temporary memory. Thus, at Step 80, the value of EPT will be calculated (via the instructions of Table 6) to be equal to T(0) or 72° F. This value of EPT will be stored in temporary memory. Using this stored value of EPT, the cooktop's microprocessor will follow the instructions as described in Table 7 and will start the sequence of Actual Power Steps, as described in Table 4, at Actual Power Step 1.

Step 84a instructs the cooktop to complete all remaining Actual Power Steps (1 through 10 and 11's). At the end of each Actual Power Step, the RFID reader/writer will transmit the value of LKPS that it just completed (not to exceed the value 10). For instance, at the end of Actual Power Step 1, during the time interval $\Delta t_{transmit}$, the RFID reader/writer will transmit the value 1 as LKPS and the RFID tag will store that value in its memory location dedicated to LKPS. Simultaneously, the RFID reader/writer will also transmit the time of day of the transmission. This information will be stored in the RFFD tag's memory location set aside for t(LKPS). At the end of each successive Actual Power Step, the RFID tag's memory will receive two new values for LKPS (up to the value 10) and t(LKPS).

Inasmuch as the sizzle plate is removed from the cooktop after 6 seconds, it will have just completed the application of Actual Power Step 3. Thus, it will have reached a temperature of approximately T(3). Furthermore, it's RFID tag will now have the following information stored in its memory when removed from the cooktop: LKPS=3, t(LKPS)=the time at which the application of Actual Power Step 3 was just completed, COB=Sizzle Plate with 1 Thermal Switch Defining the Regulation Temperature. Thus, the sizzle plate will be armed with information concerning its past charging history and will be ready to be placed upon the charger again.

Assume next that the sizzle plate is immediately placed back on the cooktop and is allowed to remain there indefinitely. Since the sizzle plate has just reached approximately temperature T(3), the sizzle plate will have the value 3 for LKPS and a value of t(LKPS) that corresponds to the end of the application of the second Actual Power Step 3 just seconds prior to this time. If the value of t(LKPS) matches that of the computer once it is replaced upon the cooktop, at Step 70, the temporary memory location corresponding to LKPS and t(LKPS) within HA(Sizzle Plate with 1 Thermal Switch Defining the Regulation Temperature) and accessible to the cooktop's microprocessor will receive those values of 3 and the value of T(3) just described. Next, at Step 72, at the time of the next test pulse of the magnetic field from the cooktop (at this time the cooktop is still in it's standby operating mode), the value of $I_{transistor}$ will be measured and stored in the HA(Sizzle Plate with 1 Thermal Switch Defining the Regulation Temperature) temporary memory location of $I_{transistor\ max\ actual}$. Using the formulas found in Table 3, the CPL's for this heating operation will be calculated at Step 74. Should the user have placed the sizzle plate in its proper location atop the cooktop, these values of CPL should be nearly equal to their corresponding IPL values. At Step 76, the value of 2100 will be assigned to n, since LKPS is equal to 3. At Step 78, the value of ELCLT will be calculated to be equal to 1 second or so and will be stored in temporary memory. Thus, at Step 80, the value of EPT will be calculated (via the instructions of Table 6) to be equal to a temperature slightly less than T(3) but more than T(2). This value of EPT will be stored in temporary memory. Using this stored value of EPT, the cooktop's microprocessor will follow the instructions as described in Table 7 and will start the sequence of Actual Power Steps, as described in Table 4, at Actual Power Step 4.

Step 84a instructs the cooktop to complete all remaining Actually Power Steps (Step 4 through 10 and into 11's). At the end of each Actual Power Step, the RFID reader/writer will transmit the value of LKPS that it just completed (up until it reaches the value 10). For instance, at the end of Actual Power Step 4, during the time interval $\Delta t_{transmit}$, the RFID reader/writer will transmit the value 4 as LKPS and the RFID tag will store that value in its memory location dedicated to LKPS. Simultaneously, the RFID reader/writer will also transmit the time of day of the transmission. This information will be stored in the RFID tag's memory location set aside for t(LKPS). At the end of each successive Actual Power Step, the RFID tag's memory will receive two new values for LKPS (not to exceed 10) and t(LKPS).

It is likely that all Actual Power Steps up to number 11 will be completed. It is also likely that the thermal switch will not cause the RFID tag to enter an altered state. Thus, the preferred method sequence of Power Step 11 activations will be followed exactly as is shown in Table 4. The cooktop will maintain the sizzle plate at approximately 250° F. indefinitely. The value of LKPS in the RFID memory will continue to remain at 10 and the value of t(LKPS) will continually be updated at the end of each Actual Power Step 11.

Next assume that the same sizzle plate is removed from the cooktop, washed, heated in an oven to 150° F., and then placed back upon the cooktop after a time period of 60 minutes and is allowed to remain there indefinitely.

In this case, the safety feature added by the thermal switch comes into play. The sizzle plate will have the value 10 for LKPS and a value of t(LKPS) that corresponds to the last of Actual Power Step 11. The value of t(LKPS) will be approximately 1 hour prior to the time that the RFID reader/writer interrogates the RFID tag in Step 70. Therefore, the temporary memory location corresponding to LKPS and t(LKPS) within HA(Sizzle Plate with 1 Thermal Switch Defining the Regulation Temperature) and accessible to the cooktop's microprocessor will receive those values of 10 and the value of t(LKPS) just described. Next, at Step 72, at the time of the next test pulse of the magnetic field from the cooktop (at this time the cooktop is still in it's standby operating mode), the value of $I_{transistor}$ will be measured and stored in the HA(Sizzle Plate with 1 Thermal Switch Defining the Regulation Temperature) temporary memory location of $I_{transistor\ max\ actual}$. Using the formulas found in Table 3, the CPL's for this heating operation will be calculated at Step 74. Should the user have placed the sizzle plate in its proper location atop the cooktop, these values of CPL should be nearly equal to their corresponding IPL values. At Step 76, the value of 0 will be assigned to n, since LKPS is equal to 10. At Step 78, the value of ELCLT will be calculated to be equal to 3600 seconds and will be stored in temporary memory. Thus, at Step 80, the value of EPT will be calculated (via the instructions of Table 6) to be equal to T(0) or 72° F. This value of EPT will be stored in temporary memory.

Because of the unauthorized heating of the sizzle plate in an oven to a temperature of 150° F., this value of EPT is incorrect. However, the instructions found in Table 7 will be followed nonetheless. Thus, using this stored value of EPT, the cooktop's microprocessor will follow the instructions as described in Table 7 and will start the sequence of Actual Power Steps, as described in Table 4, at Actual Power Step 1.

Step 84a instructs the cooktop to complete all remaining Actual Plower Steps (1 through 10 and 11's). However, the thermal switch will reach TS1 well prior to Actual Power Step 10. Thus, during the last 0.15 seconds of some Actual Power Step, the RFID tag will not communicate back to the RFID reader because it is in an altered state. The RFID reader will still know that the sizzle plate is on the charger because the answer the question in Step 68 is still "yes". Therefore, the cooktop microprocessor will follow the instructions of Step 84a and will cause the cooktop to revert to Standby mode for a period of time equal to (0.5)(MXDT). At that time the cooktop would apply Actual Power Step 11, whereby, according to Table 4, it would apply CPL5 for 2 seconds. However, during the last 0.15 seconds of CPL5, the reader would again determine the RFID tag to be in an altered state, and would thus repeat the (0.5) (MXDT) period and application of Actual Power Step 11 for the second time.

It should be evident that the thermal switch attached to the RFID tag prevents overheating of the sizzle plate should the sizzle plate be inadvertently heated by a device other than the induction heating device of this invention prior to placing it upon said induction heating device. It should also be evident that an RFID tag with two thermal switches, as shown in FIG. 10, could be used with only slight modifications to achieve the same ends. The altered state of the RFID tag with two thermal switches, when detected by the RFID reader, would be used to define the regulation temperature. Thus the regulation temperature would some temperature between TS1 and TS2.

In detail, the following is another temperature regulation scheme using a dual switch RFID tag composite such as shown in FIG. 10. This scheme accomplishes two goals: 1) it measures an intermediate temperature of an object during heal-up so as to send the Heating Algorithm to the proper heating step—to essentially "calibrate" the Heating Algorithm, and 2) it measures the time between TS1 and TS2, compare it to an ideal time stored in memory, and accordingly adjust the remaining CPL's so as to more accurately reach the desired regulation temperature.

The object to be temperature regulated must have an attached RFID tag with two or more thermal switches connected, as described above. To simplify the following discussion, the sizzle plate of FIG. 1 is employed, but with an RFID tag/dual switch composite in accordance with FIG. 10 in lieu of the single thermal switch 52. The switching temperature of thermal switch 106 (TS1) is selected to be the same as T(2), while the switching temperature of thermal switch 104 (TS2) is selected to be T(4). These two temperatures lie within the region over which CPL1, which equals IPL1, is applied.

Preferably, the induction heating device 20 is able to automatically differentiate between objects with no temperature sensors, and therefore employ the preferred temperature regulation method, and those that employ thermal switch (es), and automatically implement the appropriate temperature regulation method.

Thus, the overall software algorithm of FIG. 7 allows the alternative regulation schemes to be employed and accordingly all changes relative to the preferred embodiment are found only in the HA(COB) itself (within Step 66 of the overall algorithm, FIG. 7). Therefore, upon power up of the induction heating device, all steps in FIG. 7 will be followed identically. It is only within Step 66, where the HA(COB) is executed, that the microprocessor follows a different algorithm. The class of object (COB) code on the RFID tag that has two thermal switches attached will direct the induction heating device's microprocessor controller to follow the HA(Sizzle Plate with 2 Thermal Switches Defining Intermediate Temperatures).

In this case, three new permanent memory items are added to the RFID tag's memory list. Referring to Table 9, these memory items are TS1, TS2, and TS1/TS2__time. TS1 is the temperature at which thermal switch #1 switches, causing an altered state of transmission from the attached RFID tag. TS2 is the temperature at which thermal switch #2 switches, causing the RFID tag to move from the altered state back into the normal communication mode. TS1/TS2__ time is the elapsed time between TS1 and TS2 for the sizzle plate under ideal operating conditions. These items must be stored in the RFID tag memory because they are specific to the sizzle plate itself and, thus, should be readable by any individual induction heating device.

The value of TS2, which in this example is equal to T(4), is used as the calibration temperature such that the cooktop's microprocessor will initiate Actual Power Step #5 whenever the RFID reader/writer determines that the thermal switch #2 is activating during heat-up. For example, should a brand new sizzle plate that has inadvertently been placed in a warming oven to reach 125° F. be placed upon the induction heating device, the HA(Sizzle Plate with 2 Thermal Switches Defining Intermediate Temperatures) will calculate the Estimated Present Temperature (EPT) to be 72° F. and will thus start the Heating Algorithm at Actual Power Step #1. As soon as the RFID reader determines that TS2 has occurred (at 190° F.), the cooktop's microprocessor will bypass any intermediate Actual Power Steps and will automatically initiate Actual Power Step 5. This feature of alternative method #2 thus "calibrates" the heating algorithm to the true initial conditions of the sizzle plate.

In order to achieve the first goal (measurement of an intermediate temperature during heat-up so as to send the Heating Algorithm to the proper heating step), only the ability to determine when the RFID tag passes from an altered state to a normal state of communication, which occurs at TS2, is necessary. However, to achieve the second goal (measurement of time between TS1 and TS2 and comparison of this time to an ideal time stored in memory), it is necessary to determine the elapsed time, as measured by the real time clock, that it takes for the sizzle plate to pass from TS1 to TS2 for both an experimental heat-up under ideal conditions, said elapsed time hereafter defined as TS1/TS2_time, and for each actual heating operation, said elapsed times hereafter defined as TS1/TS2_time_actual.

The value of TS1/TS2_time stored in a specific sizzle plate's RFID memory is determined experimentally, as described above for permanent memory information, under ideal operating conditions. Those ideal operating conditions include a reference standard induction heating device operating at nominal line voltage. Furthermore, the cooktop must be applying CPL1, which equals IPL1, throughout the experimental determination. TS1/TS2_time is thus an ideal time.

A corresponding temporary memory location must be provided for that is labeled TS1/TS2_time_actual. This value will be measured by the cooktop microprocessor during each heating operation and stored in temporary memory within HA(Sizzle Plate with 2 Thermal Switches Defining Intermediate Temperatures). Furthermore, two other temporary memory locations must be provided for: TS1_time (the time, as measured by the real time clock, when the RFID reader first detects the RFID tag passing from a normal state of communication into an altered state of communication), and TS2_time (the time, as measured by the real time clock, when the RFID reader first detects the RFID tag passing from an altered state of communication into a normal state of communication). Each of these three additional temporary memory locations must be accessible to the cooktop's microprocessor during a heating operation.

Finally, the cooktop's microprocessor will be programmed with an altering step that uses the values of TS1/TS2_time and TS1/TS2_time_actual to attempt to correct for improper thermal loads during heat-up. This new altering step's commands are applied within HA(Sizzle Plate with 2 Thermal Switches Defining Intermediate Temperatures) at a new Step 48b, where Step 48b is identical to Step 84 of FIG. 8 except for the addition of the altering step commands. This new altering step's commands serve to alter the values of CPL2, CPL3, CPL4, and CPL5 based upon a comparison of the measured value of TS1/TS2_time_actual to the ideal value TS1/TS2_time. Note that the alteration will be made to the Corrected Power Levels 2 through 5 because the Heating Algorithm has already corrected the Ideal Power Level's prior to beginning the heating operation, as was previously described in connection with the preferred embodiment. This new correction to CPL2, CPL3, CPL4, and CPL5 is made at the time the cooktop's microprocessor is initiating Actual Power Step #5.

The purpose of this new altering step is to correct the applied power levels for non-ideal food loads encountered during heat-up. For instance, for the sizzle plate preferred Heating Algorithm, the Corrected Power Levels are based upon heating a sizzle plate with no food on its surface. Should the sizzle plate inadvertently be heated with a sizable food load on its surface, the preferred Heating Algorithm would cause the sizzle plate to reach an average surface temperature significantly below 250° F., the target regulation temperature. By comparing the actual time to traverse temperatures T(2) to T(4) to the ideal time to traverse the same temperature range, it can be approximately determined if the cooling load of the sizzle plate is ideal or not. For instance, if the value of TS1/TS2_time_actual is much greater than TS1/TS2_time, then there is food or some other heat sink in thermal contact with the sizzle plate. Therefore, to reach the desired surface temperature, CPL2 through CPL5 must be increased in power. The converse would be true if TS1/TS2_time_actual is found to be much less than TS1/TS2_time.

To achieve this power correction, the preferred altering step formula for the sizzle plate example, referred to as Equation 1, is as follows:

$$CPL(n)=CPL(n)*\{1+(0.1*((TS1/TS2\_time\_actual)-(TS1/TS2\_time)))\}$$

where n=2, 3, 4, and 5 in our sizzle plate example.

Of course, for other objects a different altering step equation may be more suitable, but will still involve the same compared values.

The following example heating operation illustrates the present embodiment wherein two thermal switches define intermediate temperatures. Consider a new same sizzle plate, after being heated in a warming oven to 125° F. and having food placed upon it, that is positioned upon the cooktop and is allowed to remain there indefinitely. For the following discussion, refer to FIG. 8, remembering that a new Step 84b that employs all of the instructions within Step 84 but adds the above described altering step replaces the Step 84 of FIG. 8.

In this case the sizzle plate will have zero values for LKPS and t(LKPS) when the RFID reader/writer interrogates the RFID tag in Step 70. Furthermore, the RFID reader will read a value for TS1/TS2_time that has been stored in the RFID tag. Therefore, the temporary memory location corresponding to LKPS and t(LKPS) within HA(Sizzle Plate with 2 Thermal Switches Defining Intermediate Temperatures) and accessible to the cooktop's microprocessor will receive zero values. Furthermore, the temporary memory location corresponding to TS1/TS2_time accessible to the cooktop's microprocessor will receive the value stored on the chip. For our sizzle plate example, this value is 4 seconds. Next, at Step 72, at the time of the next test pulse of the magnetic field from the cooktop (at this time the cooktop is still in it's standby operating mode), the value of $I_{transistor}$ will be measured and stored in HA(Sizzle Plate with 2 Thermal Switches Defining Intermediate Temperatures) temporary memory location of $I_{transistor\ max\ actual}$. Using the formulas found in Table 3, the CPL's for this heating operation will be calculated at Step 74. Should the user have placed the sizzle plate in its proper location atop the cooktop, these values of CPL should be nearly equal to their corresponding IPL values. At Step 76, the value of 3600 will be assigned to n, since LKPS is equal to 0. At Step 78, the value of ELCLT will be calculated to be much greater than 3600 seconds and will be stored in temporary memory. Thus, at Step 80, the value of EPT will be calculated (via the last two lines of Table 6) to be equal to T(0) or 72° F. This value of EPT will be stored in temporary memory. Using this stored value of EPT, the cooktop's microprocessor will follow the instructions as described in Table 7 and will start the sequence of Actual Power Steps, as described in Table 4, at Actual Power Step 1. Unfortunately, the sizzle plate's upper surface is actually at 125° F. with food upon it.

Fortunately, Step 84b instructs the cooktop to complete all remaining Actual Power Steps (1 through 10 and 11's) unless the RFID reader detects that the RFID tag is passing from an altered state to a normal one at TS2, at which time the cooktop's microprocessor will initiate Actual Power Step #5. Furthermore, Step 84b instructs the cooktop's microprocessor and RFID reader to read and store the times TS1_time and TS2_time, and then use them to calculate TS1/TS2_time_actual if both TS1_time and TS2_time are recorded during the same heating operation. Finally, Step 84b instructs the cooktop's microprocessor to apply Equation 1 to modify the CPL's 2, 3, 4, and 5 should a value of TS1/TS2_time_actual be successfully calculated.

Thus, shortly after applying Actual Power Step #1, the sizzle plate will reach 130° F., at which time thermal switch #1 will close and cause an altered state of communication between the RFID tag and reader when the reader attempts to write the new values of LKPS and t(LKPS). Thus, the cooktop's microprocessor will know that TS1 has been reached and will store the current time as TS1_time. Actual Power Step #2 will be applied, followed by Actual Power Step #3. At the end of Actual Power Step #3, the sizzle plate's surface will probably have reached approximately 180° F., a temperature still short of TS2. Thus, Actual Power Step #4 will be applied. During the last 0.15 seconds of Actual Power Step #4, the RFID reader/writer will attempt to transmit a new value of LKPS and t(LKPS). However, the RFID reader/writer will determine that the RFID tag has now passed from the altered state into the normal state of communications. Thus, the cooktop's microprocessor will know that TS2 has been reached and will store the current time as TS2_time. Therefore, the cooktop's microprocessor will calculate TS1/TS2_time_actual, and will proceed to apply altering Equation 1. Equation #1 will multiply each of current CPL's 2, 3, 4, and 5 by (1.2) and store these new values of CPL2, 3, 4, and 5. Finally, the cooktop's microprocessor will initiate Actual Power Step #5 and apply this new value of CPL2.

The cooktop will now proceed to apply Actual Power Steps #5 through 10 and then apply an indefinite number of Actual Power Steps #11, just as described above. At the end of each Actual Power Step, the RFID reader/writer will transmit the value of LKPS that it just completed (up to the value 10) and will transmit each corresponding value of t(LKPS).

Figure 4:
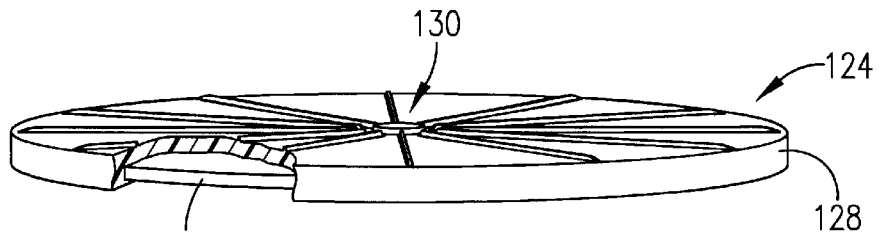
FIG. 4 is a perspective view with parts broken away illustrating a heat-retentive pellet having an RFID tag centrally secured to the upper surface thereof.

Embodiments of FIGS. 2–4

While the foregoing discussion has for exemplary purposes described the construction and operation of the servingware sizzle plate 22, the invention is not limited to any particular type of servingware or other object to be heated. For example, FIG. 2 depicts a plate 108 of conventional design, save for the provision of a metallic layer 110 on the underside thereof along with an RFID tag 112, the latter being encapsulated within a suitable epoxy or other synthetic resin body 114. Similarly, FIG. 3 illustrates an espresso cup 116 having on its base a metallic layer 118 and RFID tag 120; the latter is maintained in place with a synthetic resin matrix 122. Finally, FIG. 4 illustrates a warming pellet 124 designed to be inductively heated and used in connection with food delivery bags or the like (such as pizza bags). The pellet 124 includes an induction heatable core 126 and a surrounding synthetic resin body 128. The pellet also has a centrally disposed RFID tag 130. It will be appreciated that these devices, as well as a myriad of other types of induction heatable objects, can be used in the context of the present invention.

I claim:

1. For use with an induction heating device, an induction heatable object including a component which will be heated when subjected to a magnetic field, and an RFID tag operably coupled with said object, said tag having electronic memory, there being digital electronic information stored in said memory pertaining to the induction heating history previously experienced by said object, said tag operable to transmit said information when interrogated by an RFID tag reader, said tag also operable to store updated information received from a tag writer.

2. The object of claim 1, said object being food servingware.

3. The object of claim 1, said RFID tag carrying information about a heating characteristic of said object.

4. The object of claim 3, said heating characteristic comprising information about the class of objects to which said object belongs.

5. The object of claim 1, including at least one switch operably coupled with said RFID tag and switchable between circuit make and circuit break orientations in response to an external condition experienced by the switch, in order to alter the operation of said RFID tag.

6. The object of claim 5, said switch being a thermal switch switchable between said orientations in response to the temperature of said object.

7. The object of claim 5, said switch being coupled to the antenna of said RFID tag, said switch operable to short said antenna in one of said switch orientations.

8. The object of claim 5, including a pair of separately operable, series-connected switches coupled with said RFID tag.

9. The object of claim 5, said at least one switch operable to prevent transmission of information by the RFID tag in one of said switch orientations.

10. The object of claim 1, said tag operable for receiving and storing digital information in said memory.

11. In an induction heating device including a component for generating a magnetic field in order to inductively heat an object, control circuitry operably coupled with said generating component for selective operation thereof to vary the magnitude of said magnetic field, the improvement which comprises apparatus coupled with said circuitry for transmitting information to and receiving digital information from an RFID tag associated with said object, said control circuitry operable to reduce the magnitude of said magnetic field during the times that said apparatus is transmitting or receiving said digital information.

12. The device of claim 11, said control circuitry including a microprocessor, said apparatus comprising an RFID reader/writer and an RFID antenna.

13. The device of claim 11, said control circuitry including a sensor operable to measure a circuit parameter related to the impedance of the load experienced by said device.

14. The device of claim 11, said sensor comprising a current sensor.

15. The device of claim 11, including electronic memory operably coupled with said control circuitry for storing said digital information received from said RFID tag.

16. The device of claim 11, said component comprising an inverter.

17. The device of claim 11, said control circuitry operable to stop the operation of said component during said times.

18. The combination comprising:
    an induction heating device comprising a component for generating a magnetic field in order to inductively heat and object, control circuitry operably coupled with said generating component for selectively altering the magnitude of the generated magnetic field, and apparatus coupled with said circuitry for receiving information from an RFID tag associated with said object; and
    an induction heatable object including a component which will be heated when subjected to a magnetic field, and an RFID tag operably coupled with said object,
    said RFID tag being operable to transmit information, and said apparatus operable to receive said information,
    the operation of said device during the induction heating of said object being at least in part responsive to said information received from said RFID tag.

19. The combination of claim 18, said RFID tag carrying information about a heating characteristic of said object.

20. The combination of claim 19, said heating characteristic comprising information about the class of objects to which said object belongs.

21. The combination of claim 18, said RFID tag being operable for both transmitting and receiving information, said apparatus comprising a read/writer operable for receiving information from said RFID tag, and transmitting other information to the RFID tag.

22. The combination of claim 21, said RFID tag having memory for storing received information.

23. The combination comprising:
an induction heating device comprising a component for generating a magnetic field in order to inductively heat an object, control circuitry operably coupled with said generating component for selective operation thereof to vary the magnitude of said magnetic field, and an RFID tag reader coupled with said circuitry; and
an induction heatable object including a component which will be heated when subjected to said magnetic field, and an RFID tag operably coupled with said object,
said control circuitry operable to reduce the magnitude of said magnetic field during the times that said tag is transmitting said information to said reader.

24. The combination comprising:
an induction heating device comprising a component for generating a magnetic field in order to inductively heat an object, control circuitry operably coupled with said generating component for selective operation thereof to vary the magnitude of said magnetic field, and an RFID tag reader coupled with said circuitry, said RFID tag reader including a transmitting antenna, there being no ground plane associated with said transmitting antenna; and
an induction heatable object including a component which will be heated when subjected to said magnetic field, and an RFID tag operably coupled with said object.

25. A method of heating an induction heatable object comprising the steps of:
providing an induction heatable object having an RFID tag operably coupled thereto;
placing said object adjacent a magnetic induction heater, said heater comprising a component for generating a magnetic field in order to inductively heat said object, control circuitry operably coupled with said generating component for selectively altering the magnitude of the generated magnetic field, and apparatus coupled with said circuitry for receiving information from an RFID tag associated with said object; and
causing said RFID tag to transmit information to said apparatus for receipt thereby, and allowing said apparatus and control circuitry to control the operation of said component in at least partial response to the information transmitted by said RFID tag and received by said apparatus.

26. The method of claim 25, said transmitted information comprising a heating characteristic of said object.

27. The method of claim 26, said heating characteristic comprising information about the class of objects to which said object belongs.

28. The method of claim 27, said heating characteristic comprising information about the induction heating history previously experienced by said object.

29. The method of claim 25, including the step of causing said apparatus to transmit further information to said RFID tag.

30. The method of claim 29, said RFID tag storing said further information in RFID tag memory.

31. The combination of claim 29, said further information comprising the time that the last preceding induction heating of said object occurred.

32. The combination of claim 31, including the step of causing said RFID tag to transmit said further information back to an RFID reader.

33. The method of claim 25, including the step of intermittently stopping the operation of said component in order to cease generation of said magnetic field, and causing said RFID tag to transmit said information during at least certain of said intermittent stops in generation of said magnetic field.

34. The method of claim 25, including the step of periodically measuring a parameter of said control circuitry related to the load experienced by said device.

35. The method of claim 34, said parameter comprising the current experienced by at least a part of said control circuitry.

36. In an induction heating device including a component for generating a magnetic field in order to inductively heat an object, control circuitry operably coupled with said generating component for selective operation thereof to vary the magnitude of said magnetic field, the improvement which comprises apparatus coupled with said circuitry for transmitting information to and receiving digital information from an RFID tag associated with said object, said apparatus comprising a transmitting antenna, said transmitting antenna having no ground plane associated therewith.

37. The combination comprising:
an induction heating device comprising a component for generating a magnetic field in order to inductively heat an object, control circuitry operably coupled with said generating component for selective operation thereof to vary the magnitude of said magnetic field, and an RFID tag reader coupled with said circuitry; and
an induction heatable object including a component which will be heated when subjected to said magnetic field, and an RFID tag operably coupled with said object,
said tag having electronic memory, there being digital electronic information stored in said memory pertaining to the induction heating history previously experienced by said object, said tag operable to transmit said information when interrogated by said RFID tag reader.

38. The combination of claim 37, said object being food servingware.

39. The combination of claim 38, said object being food servingware.

40. The combination of claim 38, including at least one switch operably coupled with said RFID tag and switchable between circuit make and circuit break orientations in response to an external condition experienced by the switch, in order to alter the operation of said RFID tag.

41. The combination of claim 40, said switch being a thermal switch switchable between said orientations in response to the temperature of said object.

42. The combination of claim 40, said switch being coupled to the antenna of said RFID tag, said switch operable to short said antenna in one of said switch orientations.

43. The combination of claim 40, including a pair of separately operable, series-connected switches coupled with said RFID tag.

44. The combination of claim 40, said at least one switch operable to prevent transmission of information by the RFID tag in one of said switch orientations.

45. The combination of claim 38, said control circuitry including a sensor operable to measure a circuit parameter related to the impedance of the load experienced by said device.

46. The combination of claim 45, said sensor comprising a current sensor.

47. The combination of claim 38, said component comprising an inverter.

48. The combination of claim 37, said RFID tag memory carrying digital information about a heating characteristic of said object.

49. The combination of claim 48, said heating characteristic comprising information about the class of objects to which said object belongs.

50. The combination of claim 37, including at least one switch operably coupled with said RFID tag and switchable between circuit make and circuit break orientations in response to an external condition experienced by the switch, in order to alter the operation of said RFID tag.

51. The combination of claim 50, said switch being a thermal switch switchable between said orientations in response to the temperature of said object.

52. The combination of claim 50, said switch being coupled to the antenna of said RFID tag, said switch operable to short said antenna in one of said switch orientations.

53. The combination of claim 50, including a pair of separately operable, series-connected switches coupled with said RFID tag.

54. The combination of claim 50, said at least one switch operable to prevent transmission of information by the RFID tag in one of said switch orientations.

55. The combination of claim 37, said control circuit operable to reduce the magnitude of said magnetic field during the times when said tag is transmitting said information to said reader.

56. The combination of claim 55, said control circuitry operable to intermittently stop the operation of said component in order to allow said apparatus to receive said information from said RFID tag.

* * * * *